(12) United States Patent
Chen

(10) Patent No.: US 11,218,303 B2
(45) Date of Patent: *Jan. 4, 2022

(54) QUANTUM ATTACK-RESISTANT SYSTEM TO FACILITATE AND ENHANCE PROCESSES OF CRYPTOGRAPHY KEY EXCHANGE

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 22 days.

This patent is subject to a terminal disclaimer.

(21) Appl. No.: 16/885,312

(22) Filed: May 28, 2020

(65) Prior Publication Data

US 2021/0306144 A1     Sep. 30, 2021

(30) Foreign Application Priority Data

Mar. 27, 2020    (TW) ................................ 109110653

(51) Int. Cl.
     *H04L 9/08*      (2006.01)
     *G06F 7/57*      (2006.01)

(52) U.S. Cl.
     CPC .............. *H04L 9/0852* (2013.01); *G06F 7/57* (2013.01)

(58) Field of Classification Search
     CPC ... H04L 9/0852; H04L 9/0855; H04L 9/0838; H04L 9/0637; H04L 9/3066; H04L 9/0869; G06F 7/57
     See application file for complete search history.

(56) References Cited

U.S. PATENT DOCUMENTS

| | | | |
|---|---|---|---|
| 7,324,647 B1 * | 1/2008 | Elliott | H04B 10/70 370/390 |
| 10,250,387 B1 * | 4/2019 | Guerin | G09C 1/00 |
| 10,708,046 B1 * | 7/2020 | Ashrafi | H04L 9/0841 |
| 10,742,420 B1 * | 8/2020 | Griffin | H04L 9/0861 |
| 10,817,590 B1 * | 10/2020 | Daly | H04W 12/041 |
| 2005/0036624 A1 * | 2/2005 | Kent | H04L 9/0858 380/277 |
| 2020/0044832 A1 * | 2/2020 | Zhang | H04L 9/3073 |
| 2021/0119777 A1 * | 4/2021 | Ghosh | H04L 9/0643 |
| 2021/0203493 A1 * | 7/2021 | Chen | G06F 17/14 |
| 2021/0226782 A1 * | 7/2021 | Florit | H04L 9/0869 |

\* cited by examiner

*Primary Examiner* — Baotran N To

(57) ABSTRACT

A quantum attack-resistant system for processes of cryptography key exchange comprises a linear space computing module, a manifold computing module, and a Banach space computing module. The system implements the technologies of homotopy morphing and key cloaking for facilitating the processes of key exchange to perform quantum attack-resistant operations in a mathematics space which is different from the spaces that generic quantum attacks work on, and then retrieve the original key in a Hilbert space after the processes of key exchange. The system not only avoids quantum attacks on key exchange processes, but also avoids the defects of current PQC solutions, the vulnerability of the main streamed symmetric & asymmetric encryption systems, and the limitation of quantum key operation in a Hilbert space. Both legacy key solution and quantum key solution are provided and implemented without requiring expensive devices.

18 Claims, 21 Drawing Sheets

QUANTUM ATTACK-RESISTANT SYSTEM TO FACILITATE AND ENHANCE PROCESSES OF CRYPTOGRAPHY KEY EXCHANGE

CROSS-REFERENCE TO RELATED APPLICATION

This non-provisional application claims priority under 35 U.S.C. § 119(a) on Patent Application No(s). 109110653 filed in Taiwan, R.O.C. on Mar. 27, 2020, the entire contents of which are hereby incorporated by reference.

BACKGROUND OF THE INVENTION

1. Field of the Invention

The present invention relates to a quantum attack-resistant system, and in particular, to a system or solutions with procedures or methods that include homotopy morphing which is compatible with legacy channels and quantum channels to facilitate and enhance the cryptography key exchange processes.

2. Description of the Related Art

Conventional PQC (post quantum cryptography) technologies use hyper complicated encryption systems (such as Lattice, Code-based, Supersingular Elliptic Curve Isogency, etc.) to implement quantum attack-resistant operations for key transmission processes. Security risks depend on the quantum channel related factors including specification (such as Q-bits) of the quantum computers used on the attacker side, and the accuracy of quantum steering. The majority of current PQC solutions still have the following basic defects, including: 1) lack of a verification mechanism through inverse operation that cannot ensure the correctness and success rate for key derivation; 2) lack of lightweight design on transmission architecture that is not conducive to mass data transmission with IOT devices operating on current bandwidth; 3) lack of stability on the encryption strength of several PQC schemes. This not only increases the difficulty of quality assurance, but also affects the accuracy of the decryption processes; 4) replacement issues on many existing HTTP web servers that are caused by greatly increasing data traffic due to handshaking, encryption, and decryption mechanisms required by protocol for the PQC systems; 5) various encoding mapping issues with file transfer protocol where the issues are caused by the data scheme of the PQC system (such as Elliptic Curve, Lattice, etc.) and may lead to incorrect termination of transferred files, or even more exposure to being compromised by quantum computing attack when small messages are transferred; 6) issues on multiple possible solutions where the issues are usually caused by the ElGamal cryptography systems that cannot effectively determine the optimal solution when multiple possible solutions can be derived. Moreover, several current PQC schemes need to eliminate legacy keys, and cannot effectively utilize both legacy keys and quantum keys within the same system. Unfortunately, there are many practical restrictions to the industrial applicability of the conventional methods and systems.

However, even though there are still a few PQC solutions which could be compatible with the legacy keys, vulnerabilities or threats in current symmetric and asymmetric cryptography key systems cannot be effectively avoided. For example: 1) data transmission can only be performed in legacy channels; 2) most of the random number generation mechanisms adopt a pseudo random number generator, and such function library is easily compromised; 3) the current response mechanism for events about certificates being stolen are unsound; 4) applicable primes to current symmetric and asymmetric key systems are also mostly mastered by attacker groups, and looking for greater applicable primes will also lead to system performance issues; and 5) most importantly, to many of the conventional modulus arithmetic mechanisms in a quantum channel, no matter modular parameters or library related configurations are prone to be discovered under a period of brute-force quantum attacks or analysis via quantum cloning.

Furthermore, the current quantum cryptography key system implemented with known QKD (quantum key distribution) technology is usually operated with some restrictions due to performing the computing processes in a Hilbert space. For example: 1) in a Hilbert space, only a few known defined metrics can be applied; 2) in addition, its matrix operation must use orthonormal basis, which will increase the possibility of brute-force cracking by quantum computing attacks; 3) especially due to the restricted scope related to the physical properties of quantum itself, the amount of applicable operators in a Hilbert space is even rarer. As a result, the above relevant restrictions are not conducive to the current published quantum cryptography key system to perform quantum attack-resistant operations in a Hilbert space.

Therefore, it is desirable to have improvements on the conventional PQC approach.

BRIEF SUMMARY OF THE INVENTION

In view of the drawbacks of the prior art, it is an object of the present invention to provide a quantum attack-resistant system to facilitate and enhance processes of cryptography key exchange, wherein the system can perform some quantum attack-resistant operations coupled to the key exchange processes to prevent the legacy key or the quantum key via being compromised by quantum computing operations after an interception on key exchange processes. In accordance with this invention, even if a generic legacy key is used, the risk of a system being compromised by quantum computing attacks can be effectively reduced during the key exchange processes based on the embodiments of the present invention. The related technologies can be implemented as a device or an electronic system with reasonable cost, and can avoid a large amount of capital expenditure on eliminating the legacy key system in a short period. At the same time, the present invention effectively avoids the defects of implementation in the prior PQC solutions, the vulnerabilities of symmetric and asymmetric encryption systems on the market, and the operating restrictions of quantum keys in a Hilbert space.

To achieve the above objects and more, the present invention provides a device or system to facilitate and enhance processes of cryptography key exchange. The present invention includes a linear space computing module comprising: a quantum operators integration computing unit, for supporting basic quantum operations in a linear space; a commutative operator processing unit, to maintain the completeness of the original information; a primitive root generator unit, for deriving applicative cyclic group in the linear space; a quantum random bit generator unit, to provide true randomness for the primitive root generator unit; and an advanced arithmetic computing unit, to provide computing capability of modulo powers for data formed with algebraic structures.

In an embodiment, the quantum operators integration computing unit comprises: a unitary transformation computing sub-unit; a dimension reduction computing sub-unit; an orthonormal basis filtering sub-unit; an inner product computing sub-unit; an eigenization computing sub-unit; a Hermitian verification sub-unit; a ground state analysis sub-unit; a Laplace Transform sub-unit; and a conversion computing sub-unit. Wherein, the unitary transformation computing sub-unit is for performing unitary transformation with linear matrices; the dimension reduction computing sub-unit is making use of dimension-reduction process for a unitary matrix in a hyperspace; the orthonormal basis filtering sub-unit is for performing a verification of orthonormality for the bases of a vector space; the inner product computing sub-unit is for performing inner product operations for the vector space; the eigenization computing sub-unit is for deriving eigen value and eigen vector for the vector space; the Hermitian verification sub-unit is for checking whether a quantum operator for use is a Hermitian operator; the ground state analysis sub-unit is for finding the quantum transition probability for a ground state; the Laplace Transform sub-unit is for deriving wave vectors which are perpendicular with each other in the vector space; and the conversion computing sub-unit is for making use of suitable conversion operators to switch a vector space to a conjugated complex space. At least one or more of the above elements can be implemented, based on relevant technology, as a software unit, hardware unit, or a combination of software and hardware units. The combination of the above elements of the integration computing unit, however, results in a synergy that can provide various switching processes with basic quantum operations in the linear space efficiently, and ensure the correctness of the switching processes performed by the quantum operations.

In an embodiment, via performing a commutative operator processing unit, the result of related switching processes with the operators mentioned in the above quantum operators integration computing unit will confirm whether there is a degeneration issue with the eigen value derived from a Pauli matrix of the quantum system, wherein a system with degenerated state will validate whether a Hermitian transform is applicable, and then make use of C.S.C.O. (Complete set of commuting observables) to recover the degeneration issue to get a recovered completed result for maintaining the completeness of the original information. However, if the C.S.C.O processor cannot solve the degeneration issue, a projection-operator simulator will perform a linear combination of creation operator, annihilation operator, and the degenerated Pauli matrix to simulate the applicable projection operators, and then apply the corresponding projection states as the recovered completed result. After that, the recovered completed result will be coupled to both of the primitive root generator unit and the quantum random bit generator unit of the linear space computing module, to derive the applicative algebraic cyclic group in the linear space with true randomness.

In an embodiment, the above-mentioned advanced arithmetic computing unit comprises: an algebraic ring computing sub-unit; a Galois group computing sub-unit; and a root modulo powers of squaring process sub-unit. Wherein, the algebraic ring computing sub-unit is for performing maintenance and computing processes for data on an algebraic ring; the Galois group computing sub-unit is for deriving a Galois group and performing computing processes for it; and the root modulo powers of squaring process sub-unit is for performing squaring processes for root modulo powers by making use of Euler's theorem and Fermat's little theorem. Combining these elements in an implementation of software, hardware, or a combination of software and hardware as a computing unit provides secure algebraic operations with high complexity, and facilitates simplification and increases efficiency of the computing processes of root modulo powers.

In an embodiment, the system of the present invention includes a manifold computing module comprising a switching-operation & coupling-process unit and a key exchanging unit. The switching-operation & coupling-process unit is for performing manifold topology operations for the cryptography key in order to derive a switched key. The switching-operation & coupling-process unit comprises: a homotopy morphing computing unit for performing homotopy morphing operations on a legacy key by making use of various manifold computing sub-units to switch the legacy key into the form of Calabi-Yau manifold as a switched key; and a key cloaking computing unit for performing a cloaking process on a quantum key with a specific manifold computing sub-unit to cloak the quantum key in the form related to a heat kernel function evoluted with time intervals as a switched key. As for the key exchanging unit, it is for processing the homotopy-morphed legacy key or the cloaked quantum key (switched key) for the transmitter and receiver to facilitate and enhance key exchange processes within a communication channel, wherein the communication channel is working with transceivers coupled to the key exchanging units where each key exchanging unit includes a quantum steering component and a Bell measurement component.

In an embodiment, the above-mentioned homotopy morphing computing unit of the above manifold computing module comprises the following sub-units: a pseudo-Riemannian manifold computing sub-unit; a Finsler manifold computing sub-unit; a Calabi-Yau manifold computing sub-unit; and a parallelizable manifold verification sub-unit. Wherein, the pseudo-Riemannian manifold computing sub-unit is for switching a legacy key to a form of Lorentzian manifold; the Finsler manifold computing sub-unit is for promoting the metrics of Lorentzian manifold to a Finsler space to switch the form of Lorentzian manifold to the form of Finsler manifold; the Calabi-Yau manifold computing sub-unit is for making use of Calabi-Yau quantic polynomial to switch the form of Finsler manifold in a complex three-dimensional space to the form of Calabi-Yau manifold; and the parallelizable manifold verification sub-unit is for verifying whether the manifold of the switched form is a parallelizable manifold to confirm whether the switched key is applicable. Combining the above in an implementation of software, hardware, or a combination of software and hardware as a homotopy morphing computing unit can provide the function of homotopy morphing to switch the form of a legacy key to the form of a topology space. Such switching processes of homotopy morphing can make quantum computing operations fail to analyze a cryptography key in a Hilbert space during the processes of key exchange.

In an embodiment, the above-mentioned key cloaking computing unit of the above manifold computing module comprises the following sub-units: a Symplectic manifold computing sub-unit; a bilateral filtering sub-unit; and a heat kernel function switching sub-unit. Wherein, the Symplectic manifold computing sub-unit is for cloaking the combination of the quantum key states with a form of Symplectic manifold modeled in a phase space; the bilateral filtering sub-unit is for dropping unsuitable quantum states and retaining necessary information on the manifold edge; and the heat kernel function switching sub-unit is for switching the position operator of multiple quantum states into a heat kernel function by making use of Dirac δ-function. Combining these elements in an implementation of software, hardware, or a combination of software and hardware as a key cloaking computing unit can achieve the effect of cloaking the quantum key to switch the form of a quantum key to the form of a heat kernel function. Such switching processes of key cloaking will make quantum computing operations fail to find the quantum key states during the processes of key exchange.

In another embodiment, the above-mentioned bilateral filtering sub-unit of the above key cloaking computing unit comprises the following components: a quantum decoherence filter for filtering out the decohered quantum states; a probability threshold configuration sifter for keeping the quantum states whose probability of occurrence is higher than a configured threshold; and an information retainer for retaining important information on the non-manifold edges after the homotopy-morphing process, wherein the important information could be on the manifold edge before the homotopy-morphing process. Combining these elements in an implementation of software, hardware, or a combination of software and hardware as a bilateral filtering sub-unit can ensure the accuracy and success rate for the key cloaking computing processes on the transmitter side and the receiver side during the processes of key exchange.

In an embodiment, the above-mentioned key exchanging unit of the manifold computing module comprises: a legacy key exchanging sub-unit and a quantum key exchanging sub-unit.

Wherein, the legacy key exchanging sub-unit includes the following components: a topology surface switching processor for switching a form of topology surface to a form of differentiable manifold; and a nonlinear partial differential processor, via performing partial differential operations, for switching a form of differentiable manifold to a form with parameters of an integral equation derived from a curvature polynomial, wherein the integral equation can be parameterized. Combining these elements in an implementation of software, hardware, or a combination of software and hardware into a key exchanging unit can achieve the effect of facilitating and enhancing the key exchange processes, to switch the homotopy-morphed legacy key or the quantum key from the form of the manifold to the form derived with the integral equation of the curvature polynomial, furthermore, to parameterize the integral equation into the switched form with time function, and then to make use of the switched form as a partial differential equation evolved with time intervals, to facilitate and enhance the processes of key exchange within a legacy channel. Meanwhile, the integration of the above homotopy morphing computing unit and the legacy key exchanging sub-unit also effectively avoids the vulnerabilities usually caused by conventional legacy symmetric or asymmetric cryptography key systems during the processes of key exchange.

In an embodiment, the above-mentioned quantum key exchanging sub-unit comprises the following components: a supersingular elliptic curve encryptor for performing processes of key exchange and authentication; a Mandelbrot set generator for providing a complex plane generated by an infinite-iteration process for switching processes on the numeric pairs; and a non-trivial zeros generator for finding the non-trivial zeros in accordance with the corresponding coordinates, wherein the zeros are closed to the corresponding coordinates. A combination of these elements in an implementation of software, hardware, or a combination of software and hardware as a quantum key exchanging sub-unit can achieve the effect of facilitating the key exchange processes, to switch the numeric pairs formed from the quantum key which is cloaked in the heat kernel function to a complex plane generated by an infinite-iteration process, to find the non-trivial zeros closed to the corresponding coordinates of the complex plane, and then to make the set of all corresponding non-trivial zeros, the numeric pairs on the complex plane and the derived parameters of the complex plane, be coupled to a super-singular elliptic curve for performing encryption processes to facilitate and enhance the processes of cryptography key exchange and authentication. This sub-unit helps to provide convenience and security for a generic quantum key during the key exchange processes, and this sub-unit can be implemented through a device with reasonable cost.

In another embodiment, the above-mentioned quantum key exchanging sub-unit further comprises the following components: a twin prime generator for generating twin primes in accordance with the primes mapped from the above-mentioned non-trivial zeros; and a modular matrix verifier for performing inverse operation for verification processes with the received primes and the generated modular square matrix on the receiver side to confirm the correctness of the encrypted data exchange. Meanwhile, the integration of the above key cloaking computing unit and the quantum key exchanging sub-unit also effectively avoids the drawbacks usually caused by conventional PQC solutions during the processes of key exchange.

In another embodiment, the system of the present invention further includes a Banach space computing module comprising: a topology-Banach space switching unit for using Theorema Egregium on first manifold data in a topology space to switch it to a Banach space to derive second manifold data, wherein the first manifold data is in the form of a manifold in the topology space and the second manifold data is in the form of a manifold in the Banach space; a minimum inner isomorphism analysis unit for finding the corresponding minimum isomorphic commutative group based on the second manifold data; a smooth topological space verification unit for performing the operation to confirm the correctness of the data switching from the form in a topology space to the form in the Banach space; a Peano curve switching unit for performing switching processes from the form in a multi-dimensional Banach space to a form of Peano curve in a one-dimensional space, based on the commutative group derived from the second manifold data, to obtain a dimension-switched data, wherein the dimension-switched data is in a form of Peano curve in a one-dimension space; a Riemann integral computing unit for switching the above dimension-switched data to first geometric data in the form of a plane via performing operations of Riemann integration; a uniformly convex Banach space switching unit for performing curved surface switching processes in a uniformly convex space to switch the first geometric data in the form of a plane to second geometric data in the form of a curved surface; a super-reflexive Banach space verification unit for checking the result of mapping the second geometric data from a curved surface to a super-reflexive Banach space to confirm whether the second geometric data is applicable, and confirm whether the switching processes in a uniformly convex space fits duality and reversibility; a sub-reflexive Banach computing verification unit for checking whether the second geometric data in the form of a curved surface is differentiable, and then performing operations of dimensionality reduction and mapping process if the second geometric data is differentiable, and finally to derive third geometric data in the form of weak-star topology; and a weak-star topology space switching unit for performing linear operations on the third geometric data in a dual vector space with the basis of the Banach space, to switch the third geometric data from the form of the weak-star topology to the form of a normed vector space, wherein the switched third geometric data in the form of the normed vector space can retrieve the original cryptography key information in a Hilbert space via conducting the inner product operations and completeness. A combination of these elements in an implementation of software, hardware, or a combination of software and hardware as a Banach space computing module can achieve the effect of key space switching, to be coupled to the manifold computing module to facilitate the quantum attack-resistant processes for key exchange in the topology spaces, wherein the processes perform to switch the first manifold data from a topology space through a Banach space to a Hilbert space for retrieving the original key information after the generic key exchange processes. That will make a generic quantum computing in a Hilbert space fail to get involved in the key exchange processes enhanced by the embodiments of the present invention. Meanwhile, to a quantum cryptography system, the further integration of the above Banach space computing module, key cloaking computing unit, and the quantum key exchanging sub-unit also effectively avoids several restrictions due to the operations in a Hilbert space during the processes of key exchange.

In this way, the above embodiments of the present invention can be implemented as a full quantum attack-resistant mechanism for key exchange or mechanisms for key homotopy-morphing and key cloaking. The present invention can be implemented as a quantum attack-resistant device or system with high-strength security, and can be implemented on the transmitter side and the receiver side for data communication. In some embodiments, the present technology can be compatible with the operations of legacy cryptography key and quantum cryptography key in different algebraic spaces. That not only effectively avoids generic quantum computing attacks during the key exchange processes, but also can be implemented by devices with reasonable cost. It facilitates overcoming the bottleneck related to the requirement of heavy-cost devices for most of prior PQC solutions, and also avoids the defects of current PQC solutions, the vulnerabilities of the main streamed symmetric & asymmetric encryption systems, and the restrictions of quantum key operation in a Hilbert space.

In addition, in some embodiments, in the above-mentioned quantum attack-resistant system to facilitate and enhance processes of cryptography key exchange, in the switching-operation & coupling-process unit of the manifold computing module, the key cloaking computing unit is optional. For example, in the switching-operation & coupling-process unit of the manifold computing module, if the switching-operation & coupling-process unit only implements the homotopy morphing computing unit without implementing the key cloaking computing unit, the coupled linear space computing module does not need to implement the quantum operators integration computing unit and the commutative operator processing unit. For example, in the switching-operation & coupling-process unit of the manifold computing module, if the switching-operation & coupling-process unit only implements the homotopy morphing computing unit, the above-mentioned key exchanging unit of the manifold computing module can include the legacy key exchanging sub-unit without implementing the quantum key exchanging sub-unit.

In addition, in some embodiments, in the above-mentioned quantum attack-resistant system to facilitate and enhance processes of cryptography key exchange, in the switching-operation & coupling-process unit of the manifold computing module, for a quantum cryptography key, the homotopy morphing computing unit and the key cloaking computing unit can be used in combination. A quantum cryptography key can be performed with the processes of homotopy morphing first, and then with the processes of key cloaking, and finally perform the processes of the quantum key exchanging sub-unit to complete the mechanism with highest-strength security.

In addition, in some embodiments, in the above-mentioned quantum attack-resistant system to facilitate and enhance processes of cryptography key exchange, in the switching-operation & coupling-process unit of the manifold computing module, for a quantum cryptography key, can be implemented only by coupling the homotopy morphing computing unit for use without the key cloaking computing unit. A quantum cryptography key can be performed only with the processes of homotopy morphing, and then perform the processes of the legacy key exchanging sub-unit to avoid known malicious detection in the quantum channels.

DETAILED DESCRIPTION OF THE INVENTION

To facilitate understanding of the objects, characteristics and effects of this present disclosure, embodiments together with the attached drawings for the detailed description of the present disclosure are provided.

A plurality of embodiments in regard to a quantum attack-resistant system or implemented as a device for key exchange processes which can be compatible with legacy key or quantum key for operations in different mathematics spaces to facilitate completion of secure key exchange processes are provided as follows. In an embodiment of this aspect, the system can further implement a mechanism with technologies including homotopy-morphing operations, key cloaking processes, and complete key exchanging sub-units for both a legacy communication link and a quantum communication link to build a solution with highest-strength security. In some embodiments, this invention is implemented as a mechanism with technology in the combination of homotopy-morphing operations and security key-exchanging scheme for legacy channels where the system can perform enhanced key-exchanging processes via legacy communication links to evade malicious detection wherein such malicious detection usually concentrates on transmission through quantum channels.

In some embodiments, this technology implements a mechanism with specified space-switching operations through a Banach space to avoid key retrieving or decryption processes being compromised in a Hilbert space. In some special embodiments, the technologies for the legacy key exchanging sub-unit and the quantum key exchanging sub-unit of this invention are also applicable to be implemented for legacy communication links separately as a security scheme to provide some enhancement on key-exchanging processes for current symmetric and asymmetric cryptography key systems. In some embodiments, a solution implements the technology combination of the homotopy-morphing operations and the legacy key exchanging sub-unit to extend the life cycle for the legacy key exchanging systems and save lots of capital expenditure in the short term on the device replacement issue.

Figure 1A:
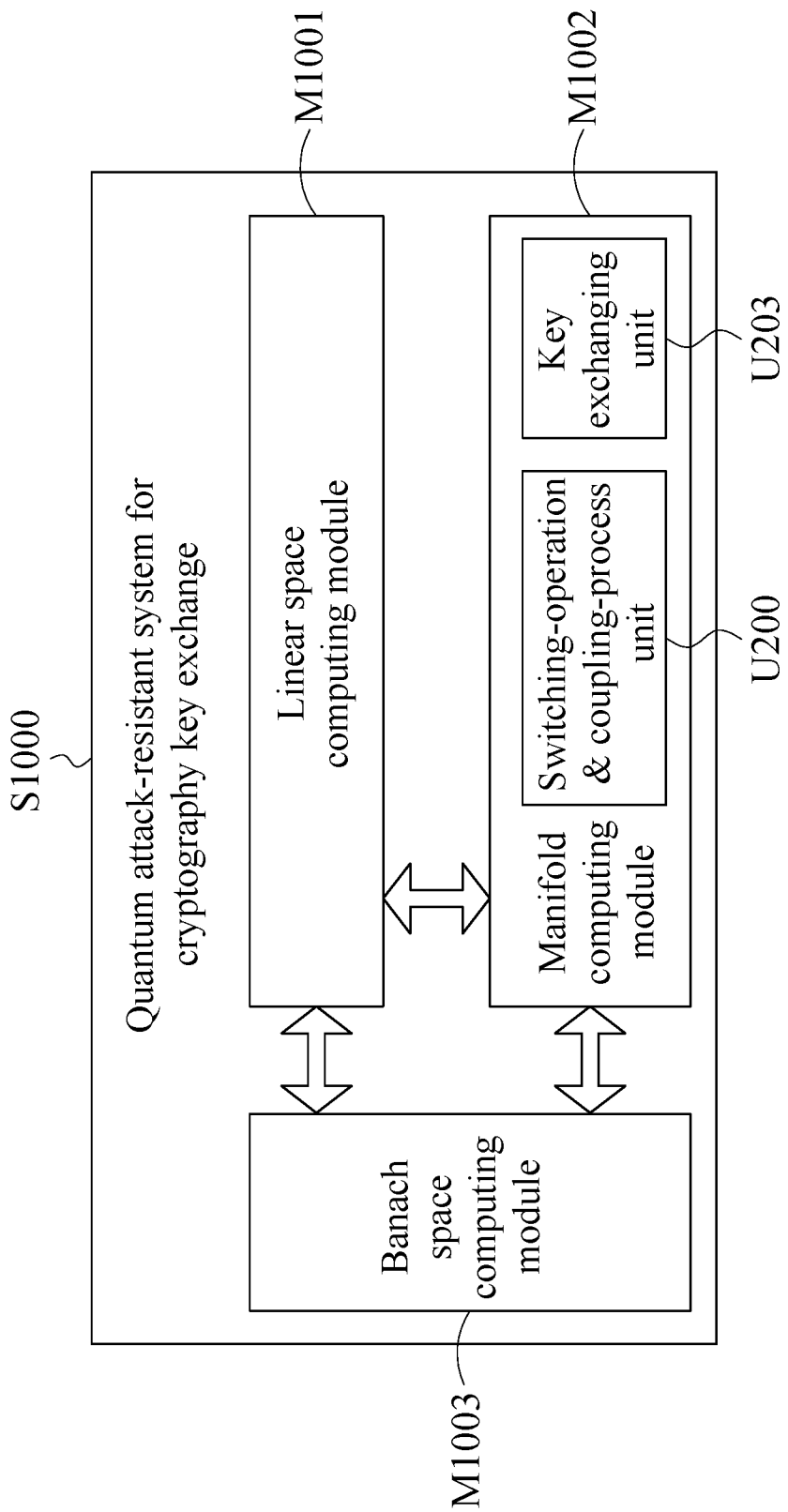
FIG. 1A is a structural block diagram of a system according to an embodiment of the present invention.

Refer to FIG. 1A, which is a structural block diagram of a quantum attack-resistant system according to an embodiment of the present invention. The quantum attack-resistant system for cryptography key exchange S1000 includes a linear space computing module M1001, a manifold computing module M1002, and a Banach space computing module M1003. The linear space computing module M1001 efficiently provides the basic operations required by various conversions in a linear space, and helps to ensure the correctness of various basic conversion operations; the manifold computing module M1002 implements the key switching processes through the switching-operation & coupling-process unit U200, such as homotopy-morphing operations or key cloaking processes, and the key exchanging unit U203 implements the mechanisms corresponding to various key switching processes to facilitate and enhance generic key-exchange processes; besides, in the Banach space computing module M1003, in addition to supporting the manifold computing module M1002 to perform the quantum attack-resistant operations in a topological space and facilitate and enhance the key exchange processes, in some embodiments, it can further switch the homotopy-morphed key or the cloaked key to the form in a Hilbert space to retrieve the original key information.

Figure 2A:
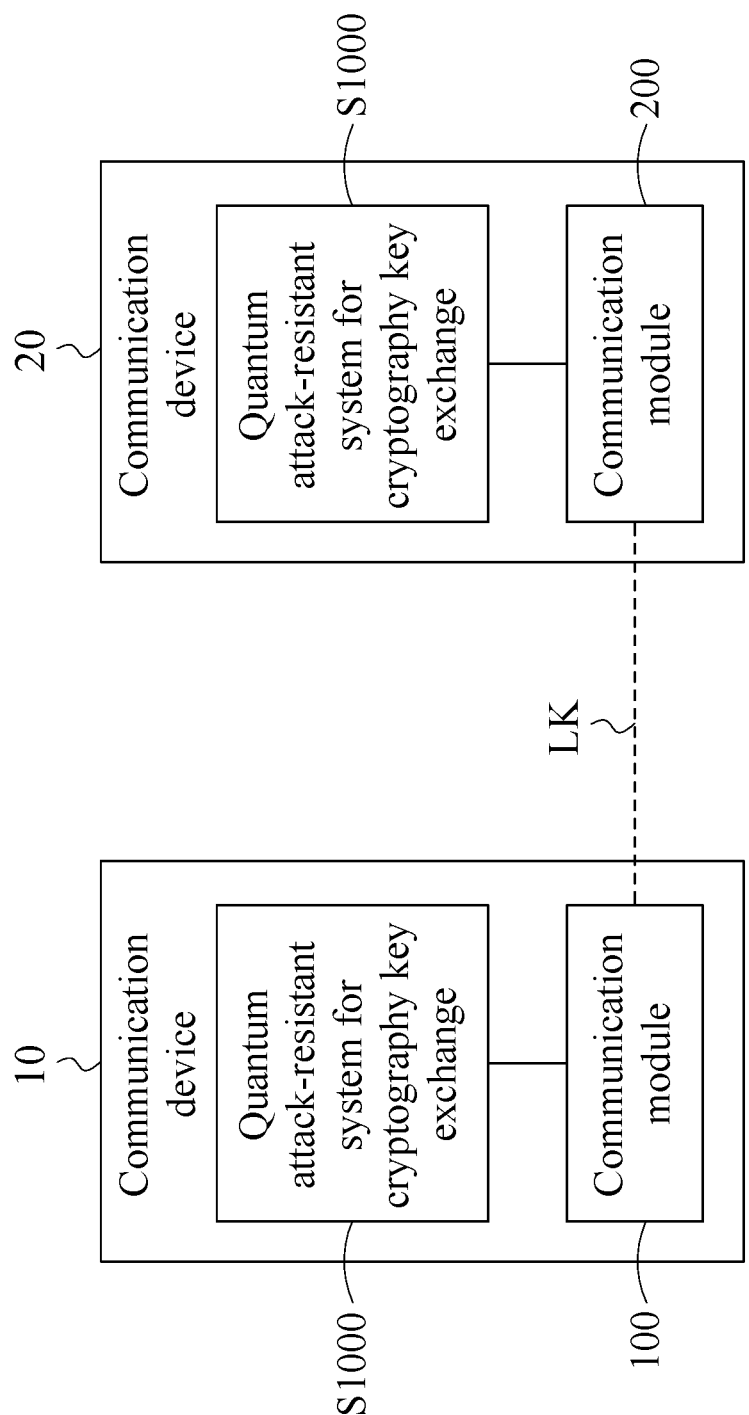
FIG. 2A is a schematic diagram of a user scenario according to an embodiment of FIG. 1A.

Refer to FIG. 2A, which is a schematic diagram of a user scenario according to an embodiment of FIG. 1A. As shown in FIG. 2A, the communication devices 10 and 20 communicate with each other through a communication link LK. The communication devices 10 and 20 are respectively installed with the quantum attack-resistant system for cryptography key exchange S1000 as shown in FIG. 1A, and connect to the corresponding communication module 100 and 200, wherein the communication module can send or receive a cryptography key through the communication link LK. The communication devices 10 and 20 can perform various conventional key exchange processes. The communication link LK can be a legacy communication channel (such as wired or wireless network communication, hereinafter "legacy channel"), or can be implemented as a quantum communication channel (such as an optical quantum channel, hereinafter "quantum channel"). Since the communication devices 10 and 20 respectively install the system S1000 as illustrated in FIG. 1A, and use S1000 to facilitate and enhance the key exchange processes, a facilitated and enhanced effect to key exchange with quantum attack-resistance is provided.

Communication devices (such as 10 or 20) can be implemented based on computing devices (such as computers, servers, or other computing devices), and communication modules (such as 100 or 200) can be a combination of software, hardware or software and hardware (such as wired or wireless network card or communication circuit, or the corresponding communication protocol program in the relevant communication channel) used in communication devices (such as 10 or 20) for data communication. For example, when a key exchange process needs to be performed between communication devices (such as 10, 20), the manifold computing module M1002 of the system S1000 can be used in the devices 10, 20. For instance, performing key switching processes through the switching-operation & coupling-process unit U200 of the manifold computing module M1002, and then process the switched key with the key exchanging unit U203. The key exchange unit U203 can be further coupled to the communication modules (such as 100 or 200) of the communication device (such as 10, 20) to deliver the switched key already processed by U203 through the communication link LK to the receiver side, to facilitate the key exchange processes. Therefore, the key exchanging unit U203 can process the switched key and make it applicable to be delivered to the transmitter side or receiver side through the corresponding communication link LK.

When using a communication device (such as 10 or 20) for the key exchange process, the quantum attack-resistant system for cryptography key exchange S1000 of the communication device can be configured to be coupled to the communication module of the communication device (such as 100 or 200), so the system S1000 is for facilitating the key exchange process between communication modules, thus it is not limited to generic key exchange processes implemented between communication devices; for example, the system S1000 can be implemented as a library, a program interface, or a hardware module, and is used or called by a dedicated program, program module, or hardware module that implements the key exchange process in the communication device; for another example, based on the system S1000, it can be implemented as an executable program or a hardware module for a key exchange process or be used as part of key exchange processes. However, the implementation of the present invention is not limited to the above instances. The key exchange processes may be various conventional or based on conventional key exchange processes or other applicable key exchange processes.

Figure 2B:
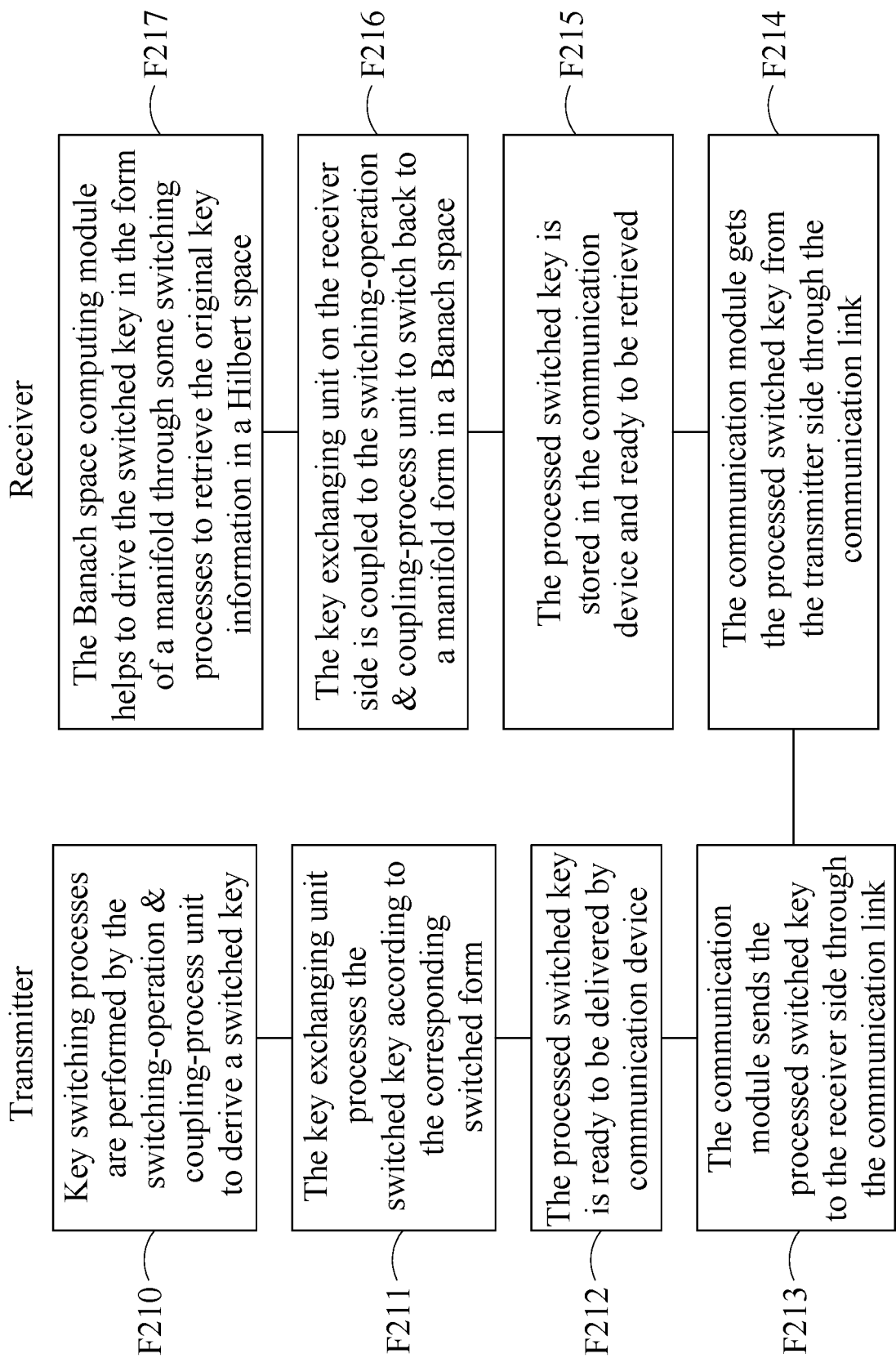
FIG. 2B is a dataflow diagram showing main data flow related to FIG. 2A.

Refer to FIG. 2B, which is a dataflow diagram illustrated for the user scenario of FIG. 2A. The following explains an applicable data flow of the present invention with FIG. 2B for clear understanding of a preferred user case. First, on the transmitter side, at block F210, the key switching processes are performed by the switching-operation & coupling-process unit U200 to derive a switched key. Second, as shown at block F211, the key exchanging unit U203 will process the switched key according to the corresponding switched form. Further, as shown at block F212, the processed switched key is ready to be delivered by the communication device (10 in FIG. 2A) which is the transmitter. Then, at block F213, the communication module (100 in FIG. 2A) will send the processed switched key to the receiver side through the communication link (LK in FIG. 2A). Thereafter, on the receiver side, as shown at block F214, the communication module (200 in FIG. 2A) gets the processed switched key from the transmitter side through the communication link LK. The next stage, as shown at block F215, the processed switched key is stored in the communication device (20 in FIG. 2A) and ready to be retrieved. Then, as shown at bock F216, the key exchanging unit U203 on the receiver side is coupled to the switching-operation & coupling-process unit U200 to switch back to a manifold form in a Banach space. Finally, as shown at block F217, the Banach space computing module M1003 helps to drive the switched key in the form of a manifold through some switching processes to retrieve the original key information in a Hilbert space. Wherein, blocks F210-F213 are performed on the transmitter side and blocks F214-F217 are performed on the receiver side.

Figure 1B:
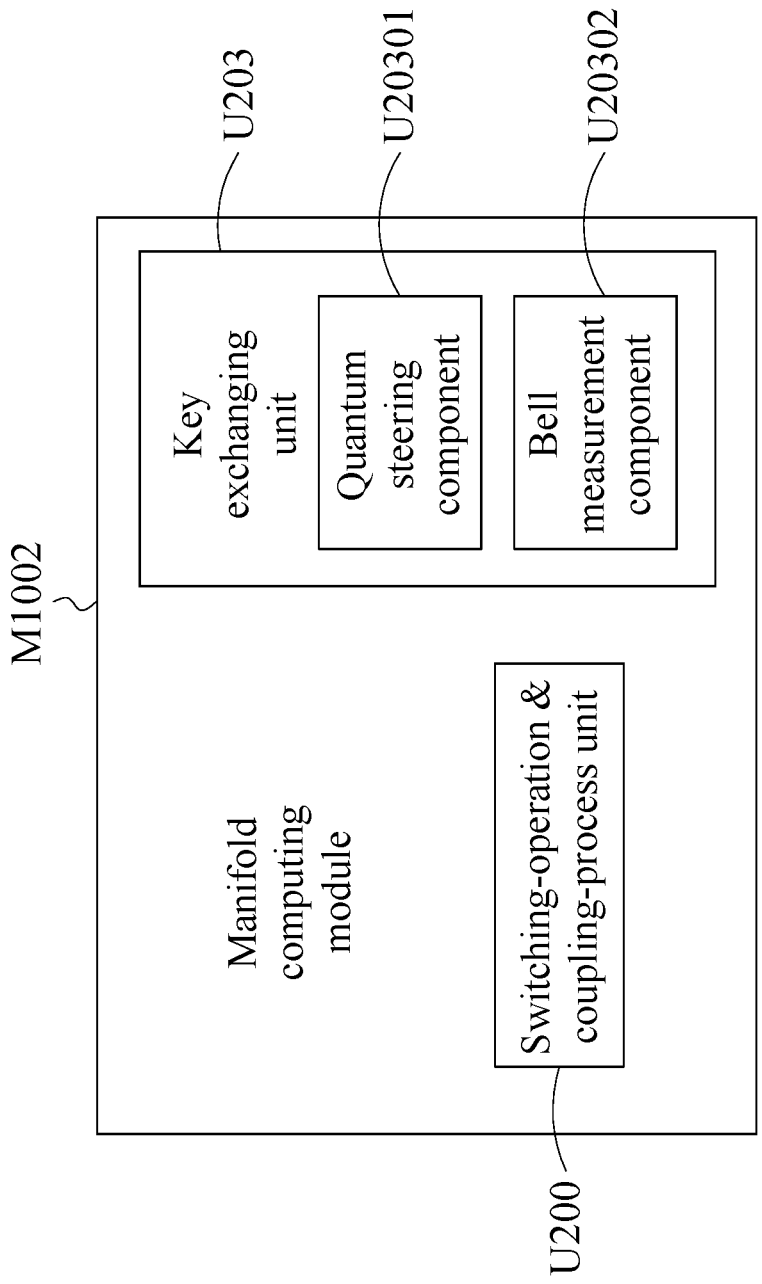
FIG. 1B is a block diagram of the manifold computing module according to an embodiment of the present invention.

Also referring to FIG. 1B, for performing the above key exchanging unit U203 coupled to the communication link (LK as shown in FIG. 2A) to facilitate quantum key exchange processes, the key exchanging unit U203 includes the following components to enhance the communication link: a quantum steering component U20301 which is for a quantum channel to perform quantum communication; and a Bell measurement component U20302 to confirm whether there is a decoherence issue with the quantum communication.

An implementation of the quantum steering component U20301 is a communication module with optical accessories (such as single-photon conducting module, beam splitter, beam divider, neutral density filter, etc.), electronic accessories and a micro-control unit driven by firmware for performing quantum steering mechanism within a quantum channel, wherein the component U20301 can facilitate the quantum communication with secure quantum teleportation. An implementation of the Bell measurement component U20302 is a communication module with optical accessories (such as linear optics, photon detectors, beam splitter, etc.), electronic accessories and a micro-control unit driven by firmware for performing Bell measurement process to confirm whether there is a decoherence issue with the quantum communication and triggering a reseeding process to ensure the quality of communication. The above implementations of the quantum steering component U20301 and the Bell measurement component U20302 are for the sake of illustration only, but the implementation of the invention is not limited thereto. For example, the above two components can be implemented as part of a communication module as well, and the micro-control unit is possible to be replaced with an ASIC, IOT device, FPGA, etc. Combining both of U20301 and U20302 within a quantum channel will facilitate and enhance the security and quality for quantum communication.

Figure 3A:
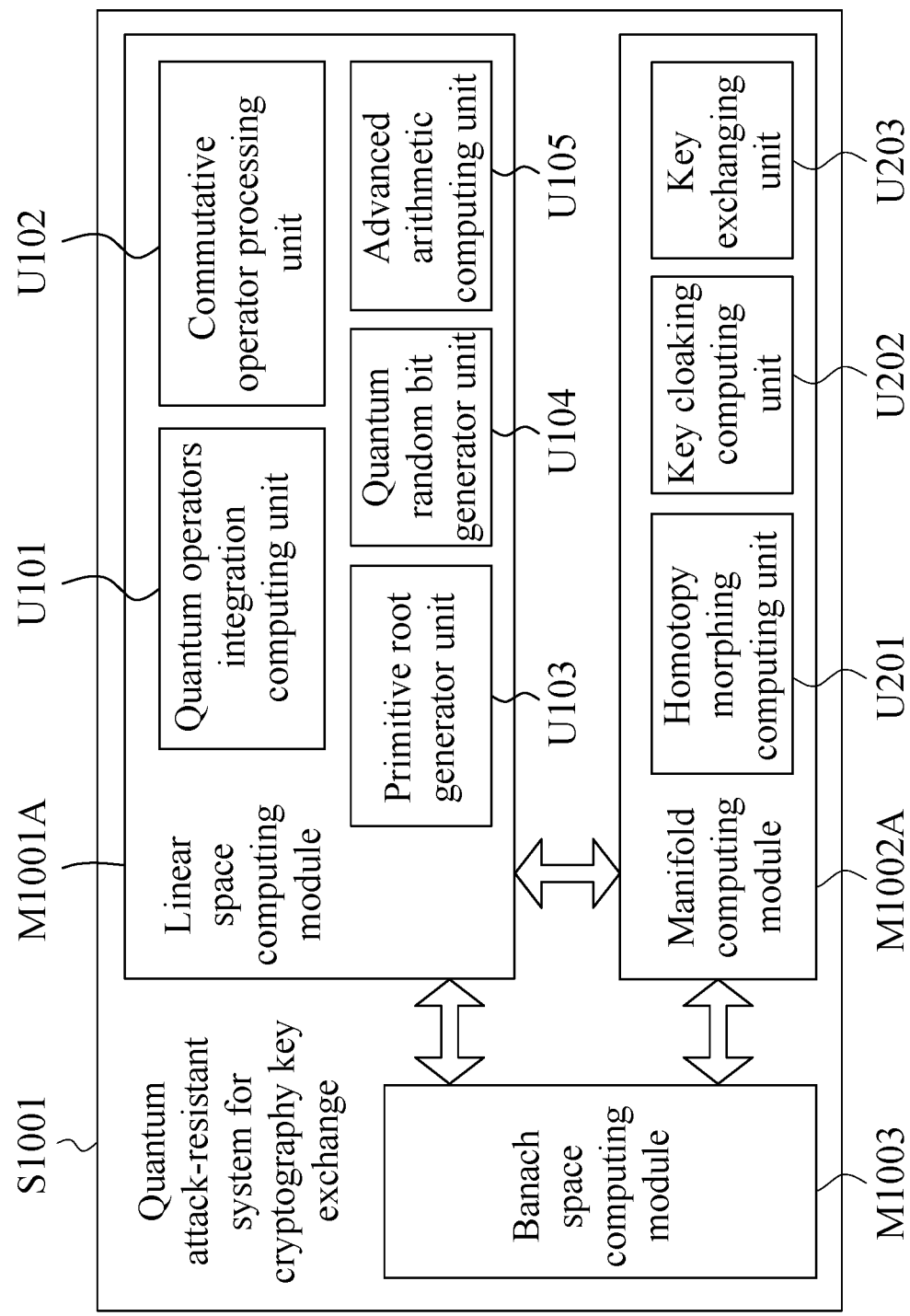
FIG. 3A is a structural block diagram of a system according to an embodiment of the present invention.

For explanation of the present invention in detail, as shown in FIG. 3A, a quantum attack-resistant system for cryptography key exchange S1001 is provided, wherein the manifold computing module M1003 is for implementing a key switching mechanism which includes the technologies of homotopy-morphing operations and key cloaking processes. Secondly, other embodiments of the system S1001 are provided as well.

A system S1001, as shown in FIG. 3A, comprises: a linear space computing module M1001A, a manifold computing module M1002A, and a Banach space computing module M1003.

The above-mentioned linear space computing module M1001A comprises the following units: a quantum operators integration computing unit U101, for supporting basic quantum operations in a linear space; a commutative operator processing unit U102, for maintaining the completeness of the original information; a primitive root generator unit U103, for deriving applicative cyclic group in the linear space; a quantum random bit generator unit U104, for providing true randomness for the primitive root generator unit; and an advanced arithmetic computing unit U105, for providing computing capability of modulo powers for data formed with algebraic structures.

Figure 4:
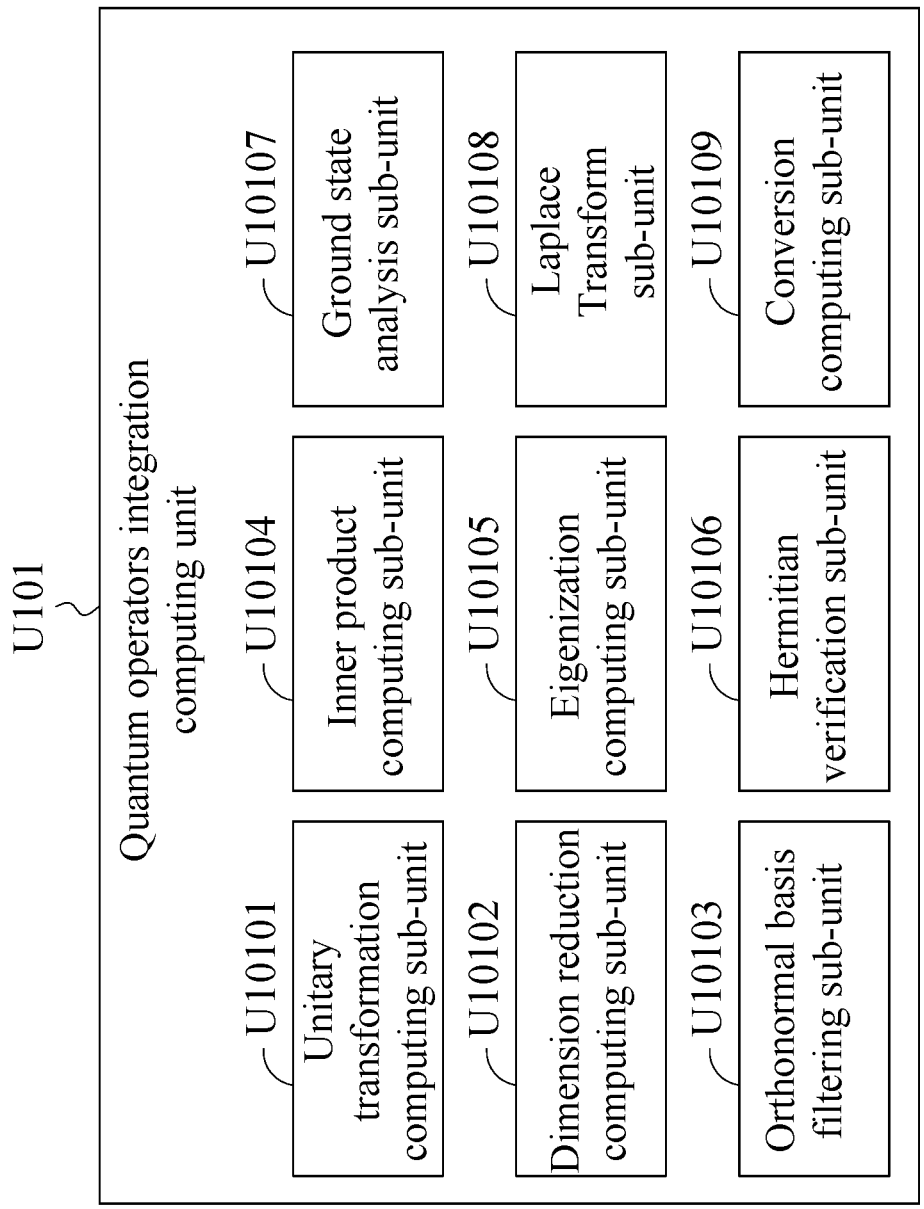
FIG. 4 is a block diagram of a quantum operators integration computing unit according to an embodiment of the present invention.

Referring to FIG. 4, for example, the quantum operators integration computing unit U101 comprises the following units: a unitary transformation computing sub-unit U10101 for performing unitary transformation for linear matrices; a dimension reduction computing sub-unit U10102 for performing a dimension reduction process for a unitary matrix in a hyperspace; an orthonormal basis filtering sub-unit U10103 for performing a verification of orthonormality for the bases of a vector space; an inner product computing sub-unit U10104 for performing inner product operations for the vector space; an eigenization computing sub-unit U10105 for deriving eigen value and eigen vector for the vector space; a Hermitian verification sub-unit U10106 for checking whether a quantum operator for use is a Hermitian operator; a ground state analysis sub-unit U10107 for finding the quantum transition probability for a ground state; a Laplace Transform sub-unit U10108 for deriving wave vectors which are perpendicular with each other in the vector space; and a conversion computing sub-unit U10109 for making use of suitable conversion operators to switch a vector space to a conjugated complex space. Combining these elements in an implementation of software, hardware, or a combination of software and hardware as an integration computing unit can provide various switching processes with basic quantum operations in the linear space efficiently, and facilitate ensuring the correctness of the switching processes performed by the quantum operations.

Figure 3B:
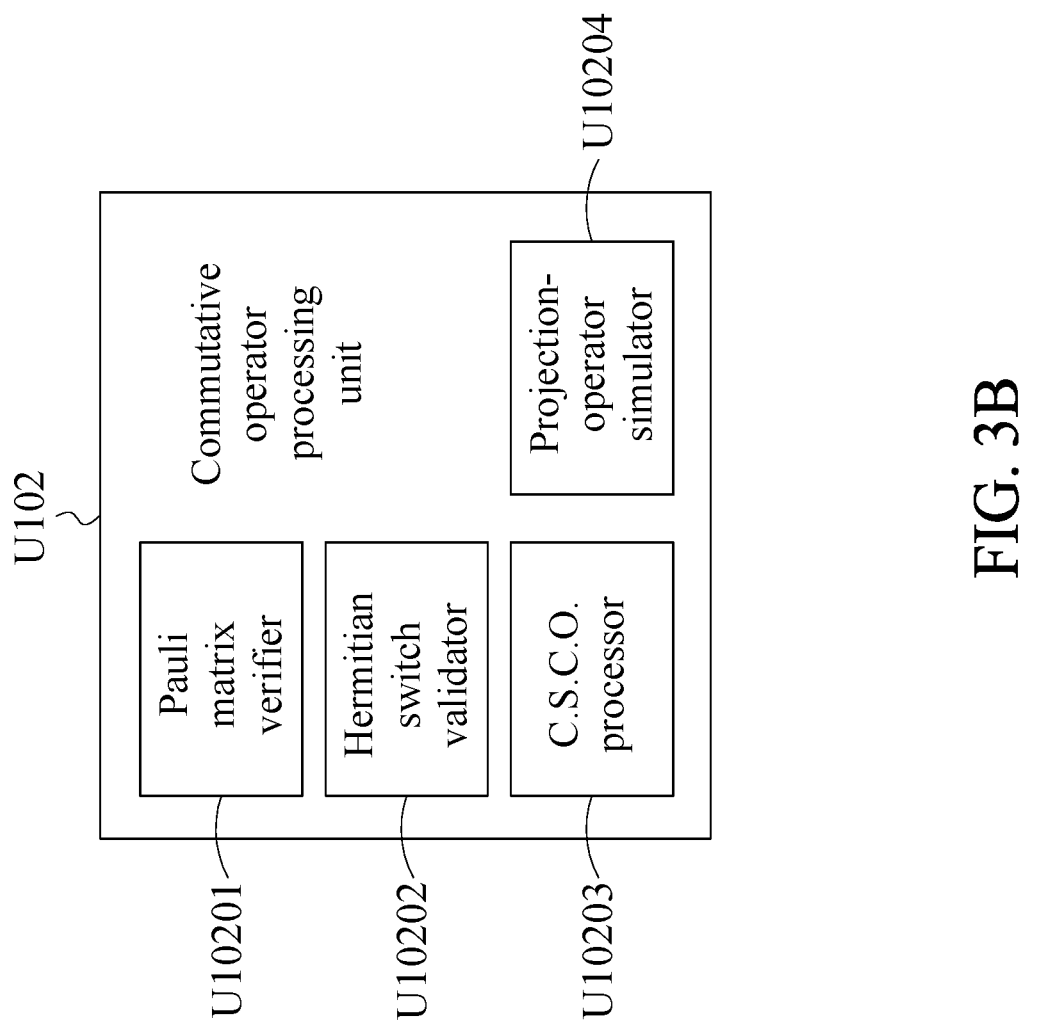
FIG. 3B is a block diagram of the commutative operator processing unit according to an embodiment of the present invention.

In an embodiment, as shown in FIG. 3A and also referring to FIG. 3B, via performing a commutative operator processing unit U102, the result of related switching processes with the operators mentioned in the above quantum operators integration computing unit U101 will be checked by U102 with a Pauli matrix verifier U10201 to confirmed whether there is a degeneration issue with the eigen value derived from a Pauli matrix of the quantum system, wherein a system with a degenerated state confirmed by U10201 will be validated by a Hermitian switch validator U10202 to see whether a Hermitian transform is applicable, and then makes use of a C.S.C.O. (Complete set of commuting observables) processor U10203 to recover the degeneration issue to get a recovered completed result for maintaining the completeness of the original information; however, if the C.S.C.O. processor U10203 cannot derive an applicable result, there is a projection-operator simulator U10204 for U101 to perform a linear combination of creation operator, annihilation operator, and the degenerated Pauli matrix to simulate the applicable projection operators, and then applies the corresponding projection states as the recovered states. After that, the recovered completed result will be coupled to both of the primitive root generator unit U103 and the quantum random bit generator unit U104 of the linear space computing module M1001A, to derive applicative algebraic cyclic group in the linear space with true randomness.

Figure 5:
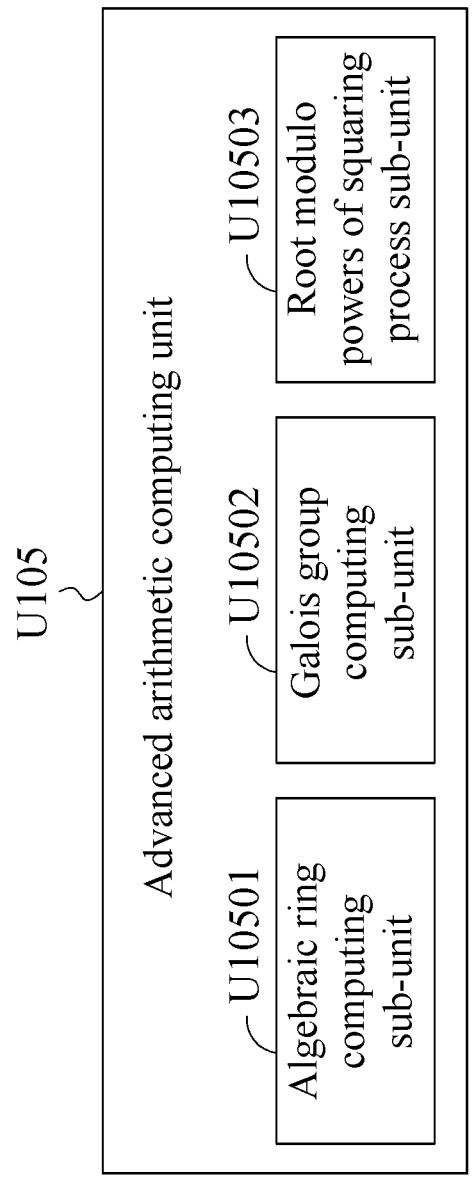
FIG. 5 is a block diagram of an advanced arithmetic computing unit according to an embodiment of the present invention.

As shown in FIG. 5, in this preferred embodiment, the above-mentioned advanced arithmetic computing unit U105 of the linear space computing module M1001A at least comprises the following three sub-units: an algebraic ring computing sub-unit U10501 for performing maintenance and computing processes for data on an algebraic ring; a Galois group computing sub-unit U10502 for deriving a Galois group and performing computing processes for it; and a root modulo powers of squaring process sub-unit U10503 for performing squaring processes for root modulo powers by making use of Euler's theorem and Fermat's little theorem. Combining these elements in an implementation of software, hardware, or a combination of software and hardware as an advanced arithmetic computing unit can provide secure algebraic operations with high complexity, and facilitate simplification of the computing processes of root modulo powers in efficiency.

Figure 6:
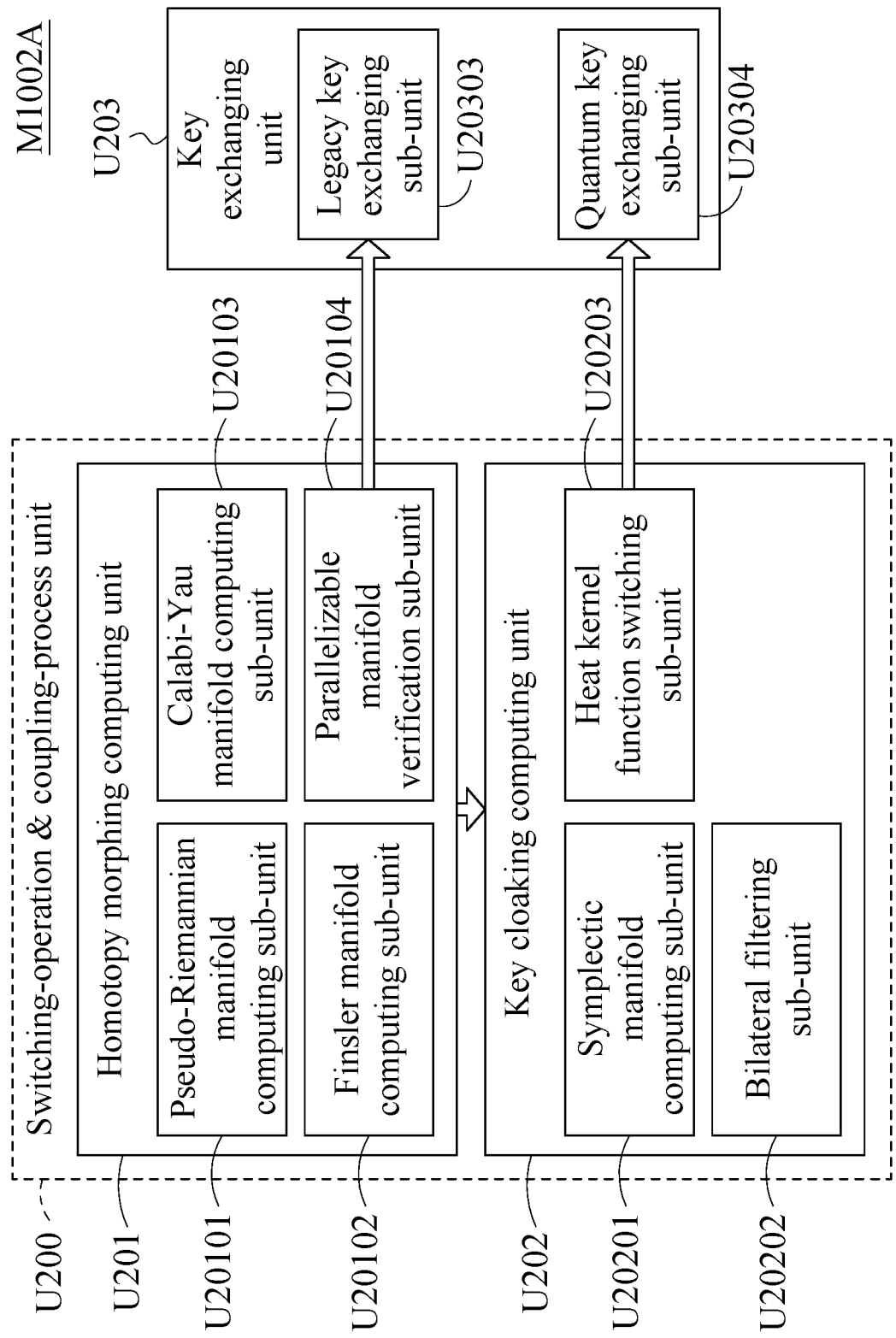
FIG. 6 is a structural block diagram of a manifold computing module according to an embodiment of the present invention.

As shown in FIG. 6, in an embodiment, the above-mentioned homotopy morphing computing unit U201 of the manifold computing module M1002A comprises the following sub-units: a pseudo-Riemannian manifold computing sub-unit U20101; a Finsler manifold computing sub-unit U20102; a Calabi-Yau manifold computing sub-unit U20103; and a parallelizable manifold verification sub-unit U20104. Wherein, the pseudo-Riemannian manifold computing sub-unit U20101 is for switching a legacy key to a form of Lorentzian manifold; the Finsler manifold computing sub-unit U20102 is for promoting the metrics of Lorentzian manifold to a Finsler space to switch the form of Lorentzian manifold to the form of Finsler manifold; the Calabi-Yau manifold computing sub-unit U20103 is for making use of Calabi-Yau quantic polynomial to switch the form of Finsler manifold in a complex three-dimensional space to the form of Calabi-Yau manifold; and the parallelizable manifold verification sub-unit U20104 is for verifying whether the manifold of the switched form is a parallelizable manifold to confirm whether the switched key is applicable. Combining these elements in an implementation of software, hardware, or a combination of software and hardware as a homotopy morphing computing unit can provide the effect of homotopy morphing, to switch the form of a legacy key to the form in a topology space. Such switching processes of homotopy morphing will make quantum computing operations fail to analyze a cryptography key in a Hilbert space during the processes of key exchange.

As shown in FIG. 6, in an embodiment, the above-mentioned key cloaking computing unit U202 of the manifold computing module M1002A comprises the following sub-units: a Symplectic manifold computing sub-unit U20201 for cloaking the combination of the quantum key states with a form of Symplectic manifold modeled in a phase space; a bilateral filtering sub-unit U20202 for dropping unsuitable quantum states and retaining necessary information on the manifold edge; and a heat kernel function switching sub-unit U20203 for switching the position operator of multiple quantum states into a heat kernel function by making use of Dirac δ-function. Combining these elements in an implementation of software, hardware, or a combination of software and hardware as a key cloaking computing unit coupled with a homotopy morphing computing unit can achieve the facilitated and enhanced effect of cloaking the quantum key and quantum key exchanging, to switch the form of a quantum key to the form of a heat kernel function. Such switching processes of key cloaking will make quantum computing operations fail to find the quantum key states during the processes of key exchange.

Figures 7, 8:
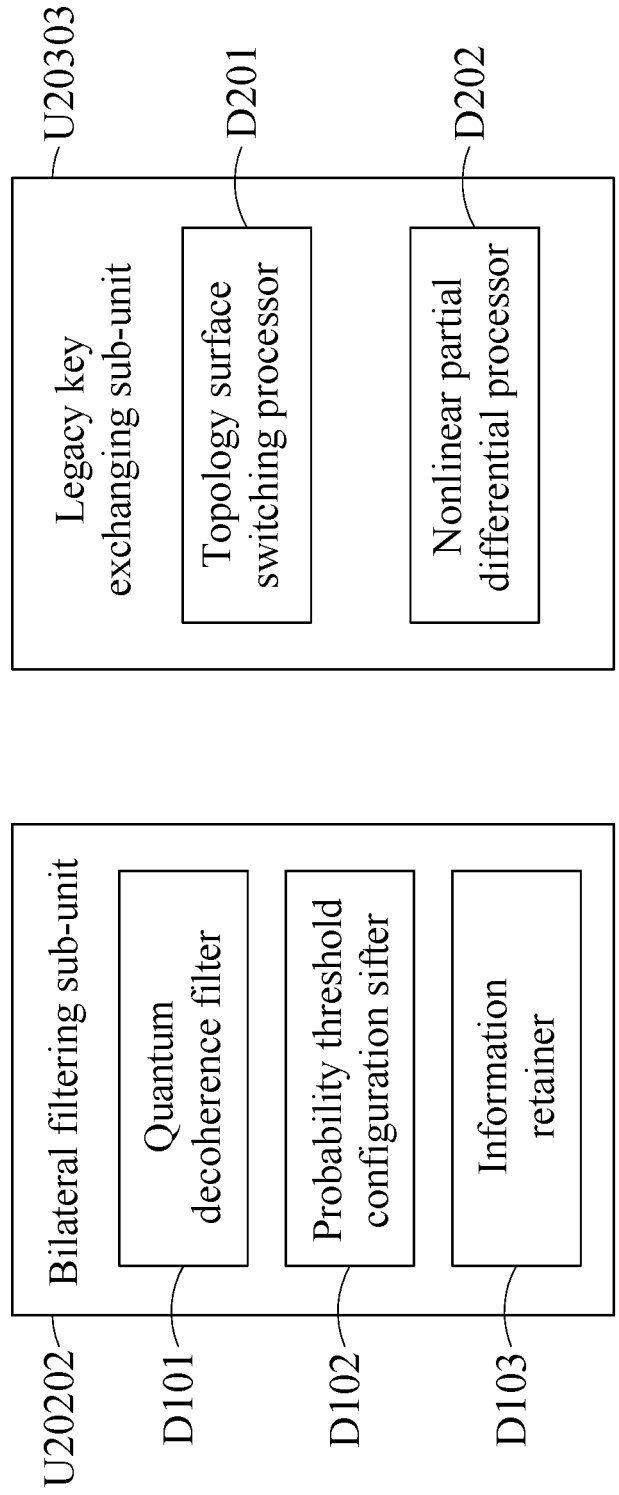
FIG. 7 is a block diagram of a bilateral filtering sub-unit according to an embodiment of the present invention.
FIG. 8 is a block diagram of a legacy key exchanging sub-unit according to an embodiment of the present invention.

Referring to FIG. 7, in an embodiment, the above-mentioned bilateral filtering sub-unit U20202 of the key cloaking computing unit U202 includes the following components: a quantum decoherence filter D101 for filtering out the decohered quantum states to ensure that there is no decohered state involved during the key exchange processes; a probability threshold configuration sifter D102 for performing wave function computing processes for keeping the quantum states whose probability of occurrence is higher than a configured threshold; and an information retainer D103 for retaining the important information on the non-manifold edges under the condition that a non-manifold edge is derived after the homotopy-morphing process, wherein the important information could be on the manifold edge before the homotopy-morphing process. Combining these elements in an implementation of software, hardware, or a combination of software and hardware as a bilateral filtering sub-unit can ensure the correctness and success rate for the key cloaking computing processes on the transmitter side and the receiver side during the processes of key exchange.

In an embodiment, referring to FIG. 6, the above-mentioned key exchanging unit U203 of the manifold computing module M1002A, is for processing the homotopy-morphed legacy key or the cloaked quantum key (switched key) on the transmitter side or receiver side to facilitate and enhance key exchange processes within a communication link (or channel), and further comprises the following sub-units: a legacy key exchanging sub-unit U20303 and a quantum key exchanging sub-unit U20304. Wherein, the legacy key exchanging sub-unit U20303 is for receiving the processed result derived from the homotopy morphing computing unit U201 to facilitate the key exchange processes within a legacy channel; and the quantum key exchanging sub-unit U20304 is for receiving the processed result derived from the key cloaking computing unit U202 to facilitate the key exchange processes within a quantum channel.

Referring to FIG. 8, in some embodiments, the above-mentioned legacy key exchanging sub-unit U20303 of the key exchanging unit U203 comprises the following components: a topology surface switching processor D201 for switching a form of topology surface to a form of differentiable manifold, wherein the topology surface is derived from U201 after homotopy-morphing processes, and the switching processor makes use of Chern-Gauss-Bonnet theorem to map the topology surface into a closed even-dimensional Riemannian manifold, and then express the manifold in the form based on an integral equation of a curvature polynomial; and a nonlinear partial differential processor D202, via performing partial differential operations, to switch a form of differentiable manifold to a form with parameters of an integral equation derived from a curvature polynomial, wherein the integral equation can be parameterized, and various curvature parameters for various curvature polynomials can be delivered within various non-linear parabola partial differential equations evolved with time intervals, and only the transmitter side and the receiver side who know the parameters for specific target times can retrieve various curvature parameters correctly after the delivery through the legacy communication link. Combining these elements in an implementation of software, hardware, or a combination of software and hardware as a legacy key exchanging sub-unit can achieve the effect of facilitating the key exchange processes, to switch the homotopy-morphed legacy key or quantum key from the form of the manifold to the form derived with the integral equation of the curvature polynomial, furthermore, to parameterize the integral equation into the switched form with time function, and then make use of the switched form as a partial differential equation evolved with time intervals, to facilitate and enhance the processes of key exchange within a legacy channel.

Figure 9:
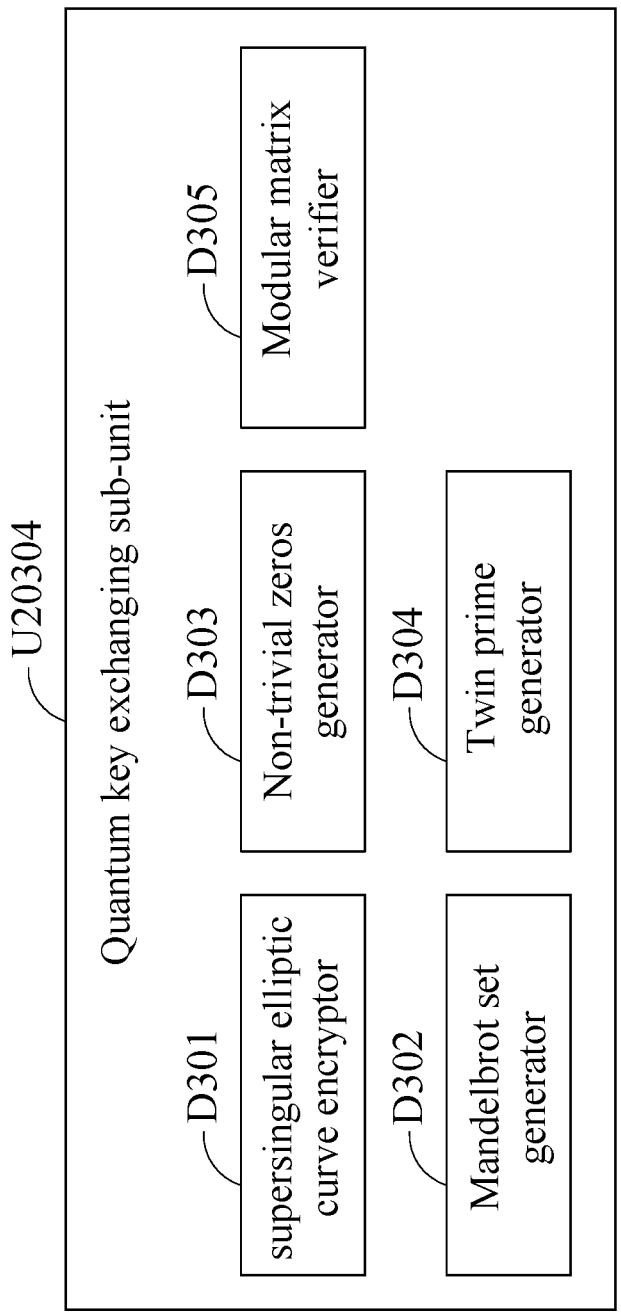
FIG. 9 is a block diagram of a quantum key exchanging sub-unit according to an embodiment of the present invention.

As shown in FIG. 9, in some embodiments, the above-mentioned quantum key exchanging sub-unit U20304 of the key exchanging unit U203 comprises the following components: a supersingular elliptic curve encryptor D301; a Mandelbrot set generator D302; and a non-trivial zeros generator D303. Wherein, for the switched result of key cloaking processes derived from U202, the quantum key exchanging sub-unit U20304 will make use of the Mandelbrot set generator D302, to switch the numeric pairs formed from the quantum key which is cloaked in the heat kernel function to a complex plane of a Mandelbrot set which is generated by an infinite-iteration process; thereafter, the non-trivial zeros generator D303 will find the non-trivial zeros which are closed to the Riemann zeta function under Riemann hypothesis in accordance with the switched numeric pairs on the complex plane of the above Mandelbrot set; and then U20304 implements the supersingular elliptic curve encryptor D301 to select a suitable super-singular elliptic curve, and use the super-singular primes which fit a Galois group as the generation points to generate encryption parameters for use in the simulation of the ElGamal encrypt algorithm, to facilitate and enhance the processes of key exchange and authentication. Combining these elements in an implementation of software, hardware, or a combination of software and hardware as a quantum key exchanging sub-unit can achieve the effect of facilitating the key exchange processes, to switch the numeric pairs formed from the quantum key which is cloaked in the heat kernel function to the form with parameters of a super-singular elliptic curve to facilitate and enhance the processes of cryptography key exchange and authentication. This sub-unit helps to provide convenience and security for a generic quantum key during the key exchange processes, and this sub-unit can be implemented through a device with reasonable cost.

Referring to FIG. 9, in an embodiment, the above-mentioned quantum key exchanging sub-unit U20304 of the key exchanging unit U203 further comprises the following two components: a twin prime generator D304 and a modular matrix verifier D305. Wherein, the twin prime generator D304 will generate twin primes (primes fit the Twin Prime Conjecture) in accordance with the primes mapped from the above-mentioned non-trivial zeros derived by D303 and combine the primes derived from the non-trivial zeros with the corresponding twin primes to be a modular square matrix; thereafter, the modular matrix verifier D305 performs an inverse operation for verification processes with both of the received super-singular primes from D301 and the generated modular square matrix from D304, on the receiver side to confirm the correctness of the encrypted data exchange. Combining these elements in an implementation of software, hardware, or a combination of software and hardware as a quantum key exchanging sub-unit can achieve the effect of facilitating the key exchange processes, and further ensure the correctness and success rate for quantum key exchange.

Figure 10A:
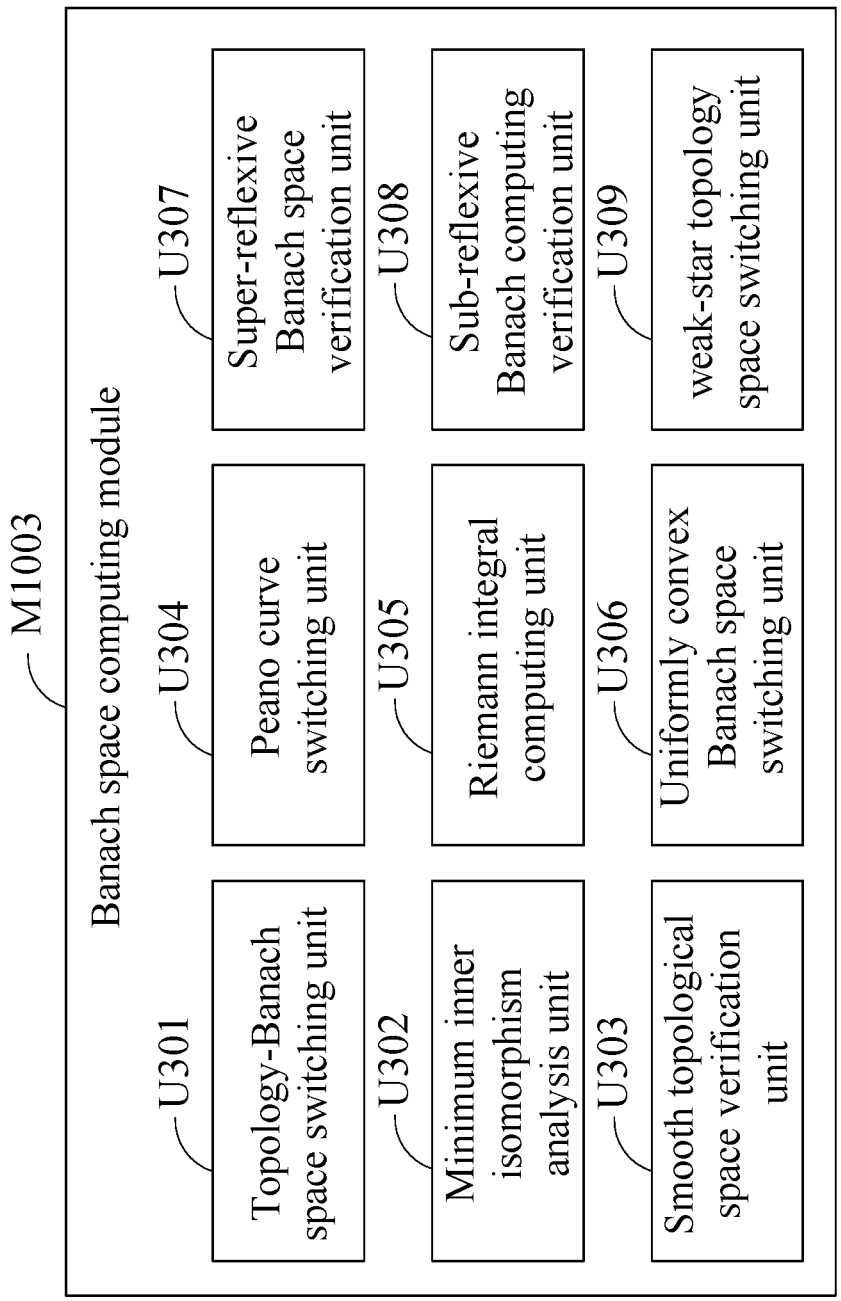
FIG. 10A is a block diagram of a Banach space computing module according to an embodiment of the present invention.

Referring to FIG. 10A, in some embodiments, the above-mentioned Banach space computing module M1003 comprises the following units: a topology-Banach space switching unit U301; a minimum inner isomorphism analysis unit U302; a smooth topological space verification unit U303; a Peano curve switching unit U304; a Riemann integral computing unit U305; a uniformly convex Banach space switching unit U306; a super-reflexive Banach space verification unit U307; a sub-reflexive Banach computing verification unit U308; and a weak* (weak-star) topology space switching unit U309.

Figure 10B:
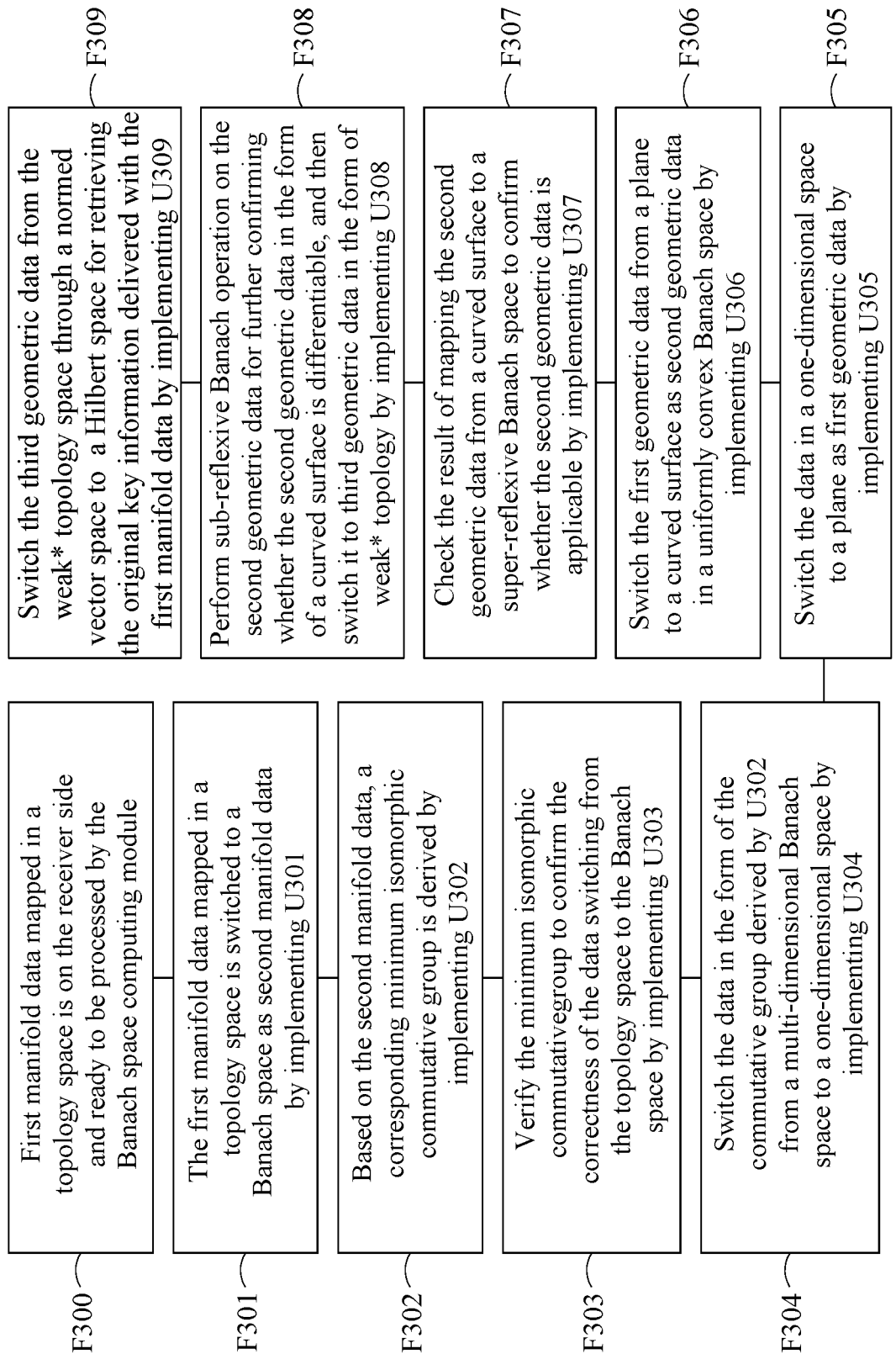
FIG. 10B is a dataflow diagram of a Banach space computing module according to an embodiment of the present invention.
Figure 10C:
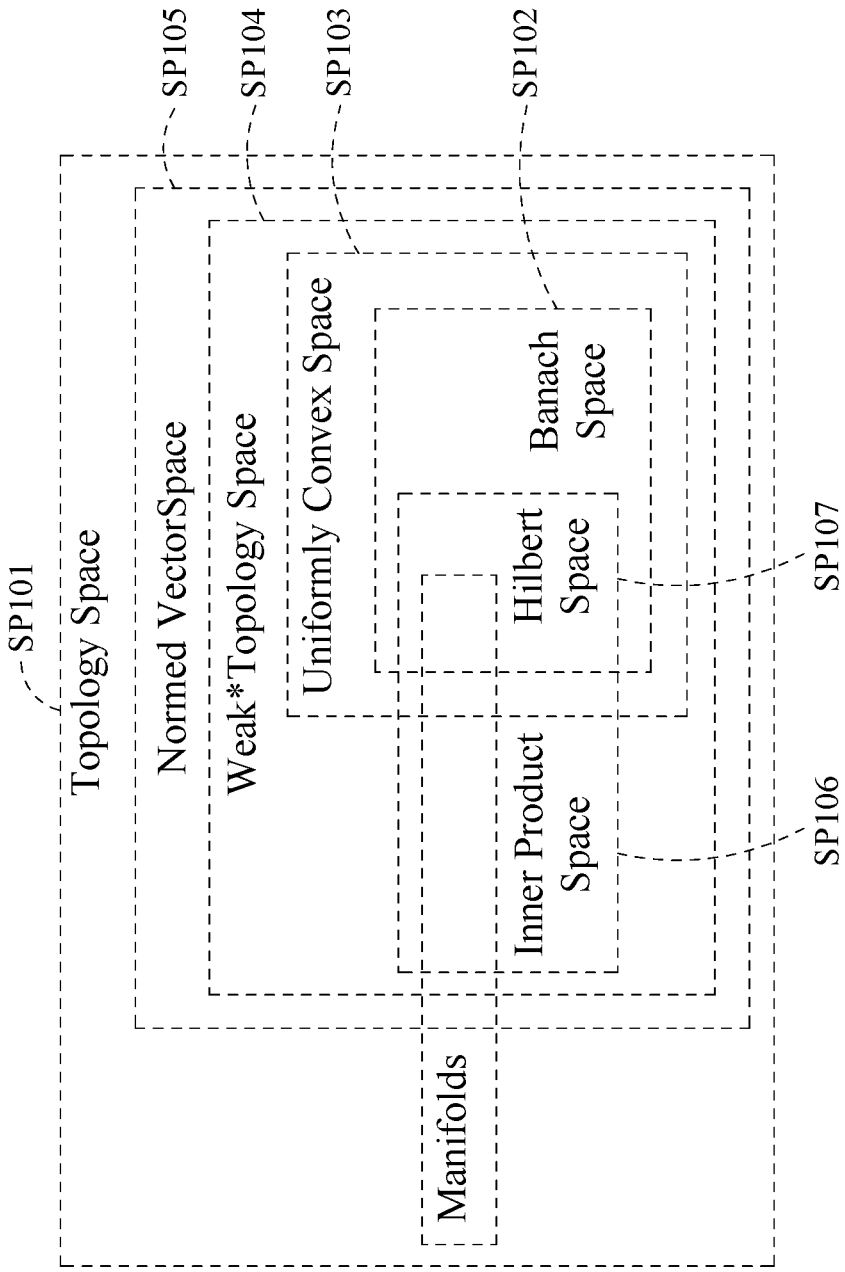
FIG. 10C is a hierarchy diagram of mathematics spaces for the Banach space computing module according to an embodiment of the present invention.

Refer to FIG. 10C, which is a hierarchy diagram to illustrate the space switching logic for the Banach space computing module M1003 in the present invention. As shown in FIG. 10C, manifold data can be switched between various mathematics spaces, wherein the M1003 makes the manifold data in a topology space SP101 be switched to a Banach space SP102 first; then performs operation to map the manifold data which is in a Banach space SP102 to a uniformly convex space SP103 based on the Banach basis; after that, the manifold data is switched to a weak* topology space SP104; thereafter, it is switched from the weak* topology space SP104 to a normed vector space SP105 through a dual space operation with the basis of the Banach space; finally, the manifold data is switched from the normed vector space SP105 through an operation of inner product space SP106 to a target Hilbert space SP107. Refer to FIG. 10B, which explains the main data flow for the operations performed by M1003. First, at block F300, first manifold data mapped in a topology space is on the receiver side and ready to be processed by the Banach space computing module M1003; secondly, at block F301, the first manifold data mapped in a topology space is switched to a Banach space as second manifold data by implementing U301; thereafter, at block F302, based on the second manifold data, a corresponding minimum isomorphic commutative group is derived by implementing U302; thereafter, at block F303, verify the minimum isomorphic commutative group to confirm the correctness of the data switching from the topology space to the Banach space by implementing U303; thereafter, at block F304, switch the data in the form of the commutative group derived by U302 from a multi-dimensional Banach space to a one-dimensional space by implementing U304; after that, at block F305, switch the data in a one-dimensional space to a plane as first geometric data by implementing U305; after that, at block F306, switch the first geometric data from a plane to a curved surface as second geometric data in a uniformly convex Banach space by implementing U306; then at block F307, check the result of mapping the second geometric data from a curved surface to a super-reflexive Banach space to confirm whether the second geometric data is applicable by implementing U307; after that, at block F308, perform a sub-reflexive Banach operation on the second geometric data for further confirming whether the second geometric data in the form of a curved surface is differentiable, and then switch it to third geometric data in the form of weak* topology by implementing U308; lastly, at block F309, switch the third geometric data from the weak* topology space through a normed vector space to a Hilbert space for retrieving the original key information delivered with the first manifold data by implementing U309.

Based on FIG. 10A, the following is an introduction of the operations performed by M1003. Wherein, before the processes for M1003, the above-mentioned manifold computing module M1002A (as shown in FIG. 3A) obtains first manifold data in a topology space on the receiver side after the processes for the key exchanging unit U203 (as shown in FIG. 6) on the transmitter side, and then M1003 drives the topology-Banach space switching unit U301 to make use of Theorema Egregium on the first manifold data in a topology space through the processes of local isometry with an intrinsic invariant of a surface (such as Gaussian curvature), to switch it to the form in a Banach space to derive second manifold data; thereafter, in a Banach space, a minimum inner isomorphism analysis unit U302 will find the corresponding minimum isomorphic commutative group based on the second manifold data through the processes of an isometric approximation method; thereafter, the above-mentioned smooth topological space verification unit U303 performs the operation through the processes of Cauchy inequality for convergence verification on the minimum isomorphic commutative group to confirm the correctness of the data switching from the form in a topology space to the form in the Banach space; thereafter, the Peano curve switching unit U304 performs switching processes from the form in a multi-dimensional Banach space to a form of Peano curve in a one-dimensional space, based on the commutative group derived from U302, to obtain a dimension-switched data, wherein the dimension-switched data is in a form of Peano curve in a one-dimension space; thereafter, the Riemann integral computing unit U305 switches the above dimension-switched data to first geometric data in the form of a plane via performing operations of Riemann integration; thereafter, the above-mentioned uniformly convex Banach space switching unit U306 performs the curved surface switching processes in a uniformly convex Banach space to switch the first geometric data derived from U305 to second geometric data in the form of a curved surface; thereafter, the super-reflexive Banach space verification unit U307 will check the result of mapping the second geometric data from a curved surface to a super-reflexive Banach space to confirm whether the second geometric data is applicable, and confirm whether the switching processes in a uniformly convex space fits duality and reversibility; thereafter, the sub-reflexive Banach computing verification unit U308 will perform a sub-reflexive Banach operation on the second geometric data for further confirming whether the second geometric data in the form of a curved surface is differentiable, and then perform operations of dimensionality reduction and mapping process with only retaining its weak metric attributes to avoid missing important information if the second geometric data is differentiable, and then to derive third geometric data in the form of weak* topology; and lastly, the weak-star topology space switching unit U309 performs linear operations on the third geometric data in a dual vector space with the basis of the Banach space, to switch the third geometric data from the form of the weak-star topology to the form of a normed vector space, wherein the switched third geometric data in the form of the normed vector space can retrieve the original cryptography key information in a Hilbert space via conducting the inner product operations and completeness, wherein the original cryptography key information is delivered with the form of the first manifold data through the communication link. Combining these elements in an implementation of software, hardware, or a combination of software and hardware as a Banach space computing module can achieve the effect of key space switching, to be coupled to the manifold computing module to facilitate the quantum attack-resistant processes for key exchange in the topology spaces, wherein the processes perform to switch the first manifold data from a topology space through a Banach space to a Hilbert space for retrieving the original key information after the generic key exchange processes. That will make a generic quantum computing in a Hilbert space fail to get involved in the key exchange processes enhanced by the embodiments of the present invention.

In addition, in some embodiments, the implementation of the above quantum attack-resistant system for cryptography key exchange, wherein in the switching-operation & coupling-process unit of the manifold computing module, the homotopy morphing computing unit or the key cloaking computing unit is optional.

Figure 11:
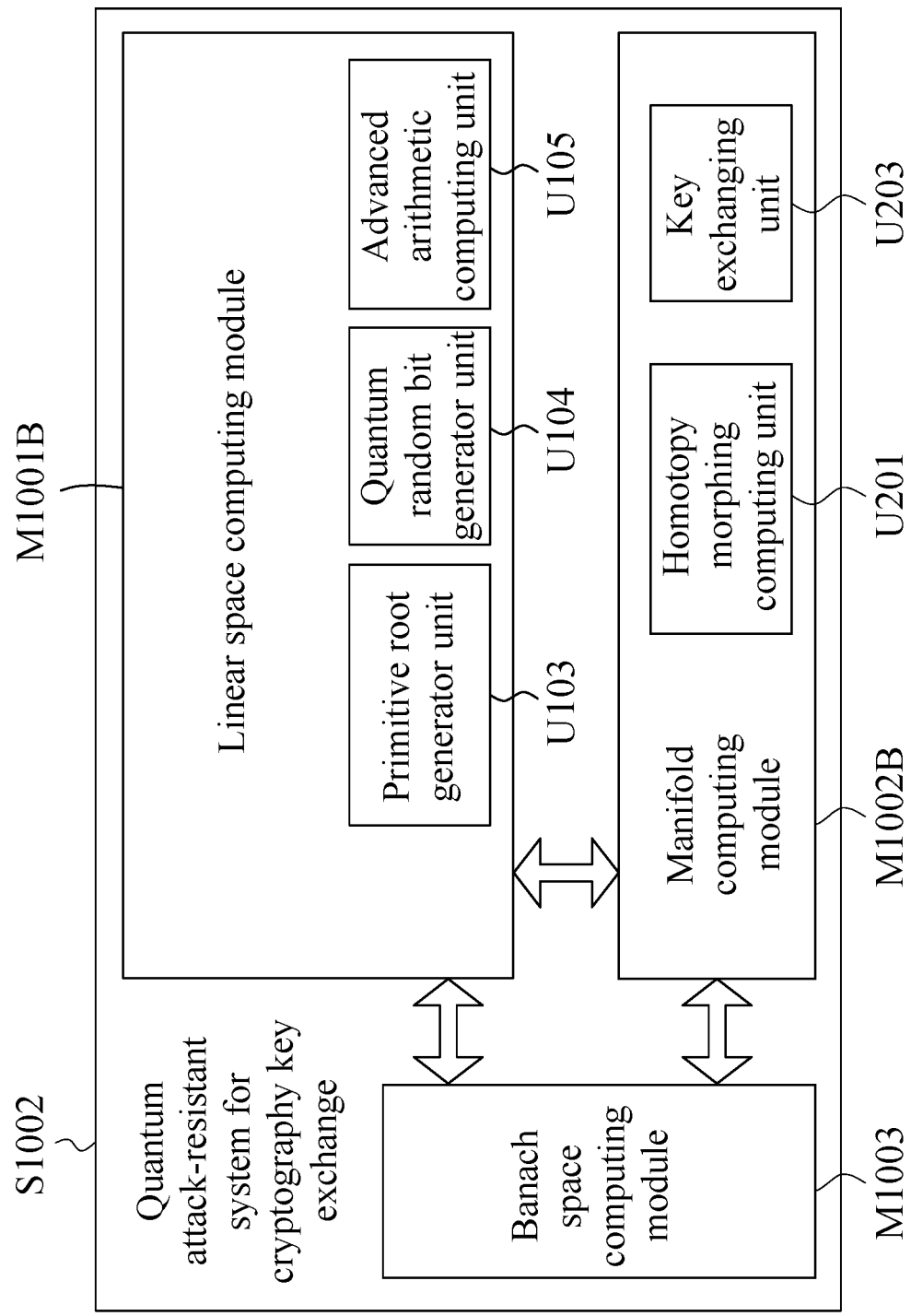
FIG. 11 is a structural block diagram of a system according to an embodiment of the present invention.
Figure 12:
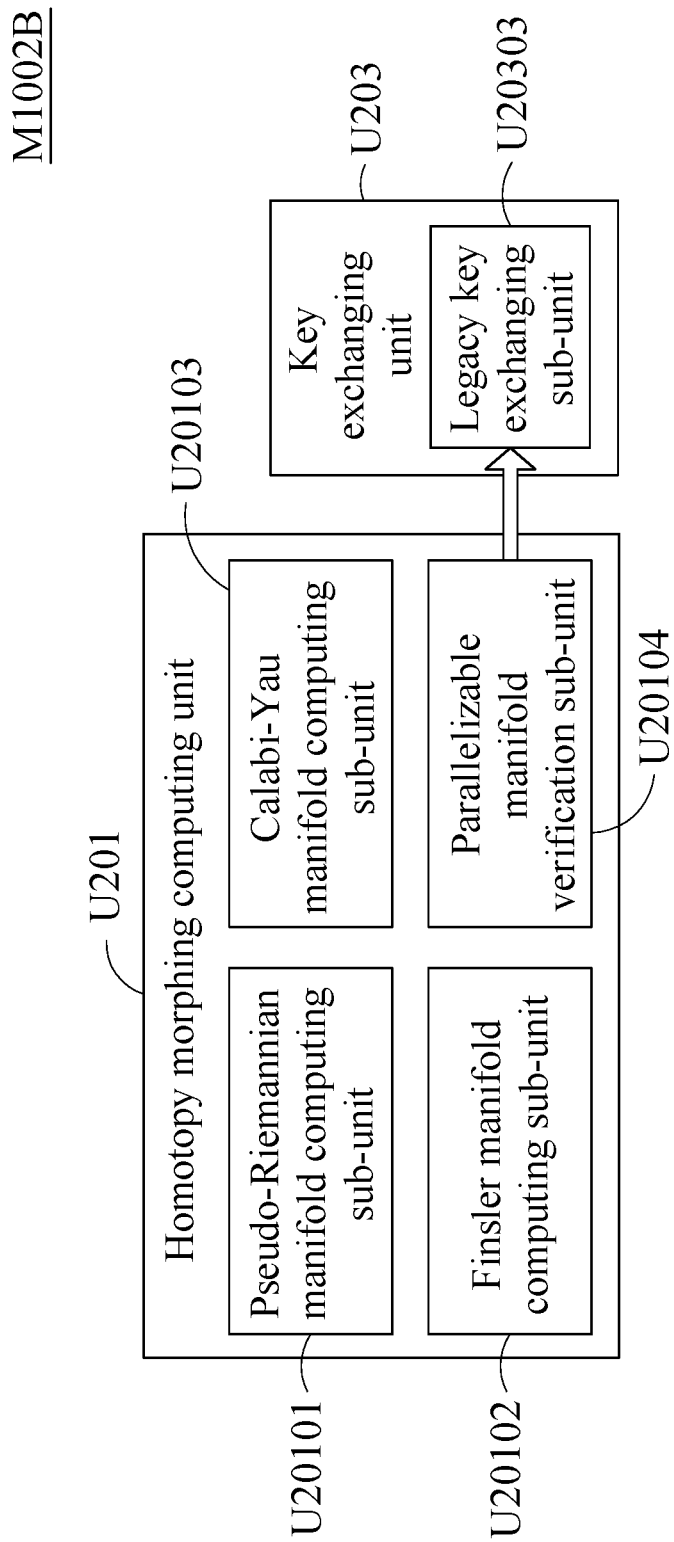
FIG. 12 is a structural block diagram of a manifold computing module according to an embodiment of the present invention.

The quantum attack-resistant system for cryptography key exchange can be implemented in an application scenario where legacy keys are used. Please refer to FIG. 11, which is a structural block diagram of a system according to an embodiment of the present invention. As shown in FIG. 11, a quantum attack-resistant system for cryptography key exchange S1002 includes a linear space computing module M1001B, a manifold computing module M1002B and a Banach space computing module M1003. The difference between the quantum attack-resistant system for cryptography key exchange S1002 as shown in FIG. 11 and the one S1001 as shown in FIG. 3A is that the manifold computing module M1002B can at least implement the homotopy morphing computing unit U201 in the embodiment of FIG. 11; therefore, the quantum operators integration computing unit U101 and the commutative operator processing unit U102 in the linear space computing module M1001B are optional, so it is applicable not to implement the quantum operators integration computing unit U101 and the commutative operator processing unit U102 in this kind of embodiment. Please refer to FIG. 12, which is a structural block diagram of a manifold computing module to an embodiment of FIG. 11. As shown in FIG. 12, the manifold computing module M1002B includes a homotopy morphing computing unit U201 (that is, the switching-operation & coupling-process unit U200 as shown in FIG. 1A includes the homotopy morphing computing unit U201) and the corresponding key exchanging unit U203 comprising a legacy key exchanging sub-unit U20303, which can be implemented with reference to the aforementioned corresponding embodiments (see FIG. 6 and FIG. 8). This embodiment may save the initial cost of equipment when the present invention is applied to a legacy key exchange system.

The quantum attack-resistant system for cryptography key exchange can be implemented in an application scenario where quantum keys are used. Please refer to FIG. 6, in another embodiment of the quantum attack-resistant system for cryptography key exchange, in the case for quantum keys, the homotopy morphing computing unit U201 and the key cloaking computing unit U202 can be implemented in combination. The system can perform the operations of homotopy morphing on U201 for quantum keys first, thereafter perform the key cloaking processes on U202, and then perform the processes of the quantum key exchanging sub-unit U20304. This embodiment can implement the highest-strength security mechanism of the present invention.

The quantum attack-resistant system for cryptography key exchange can be implemented in an application scenario where quantum keys are used. Please refer to FIG. 6, in an embodiment of the quantum attack-resistant system for cryptography key exchange, in the case for quantum keys, the homotopy morphing computing unit U201 can be coupled to the system in standalone mode without implementing U202. The system can perform the operations of homotopy morphing on U201 for quantum keys first, and then perform the processes of the legacy key exchanging sub-unit U20303. This embodiment can implement an evasive security mechanism of the present invention for cloaked quantum keys to be exchanged through legacy channels.

Figure 13:
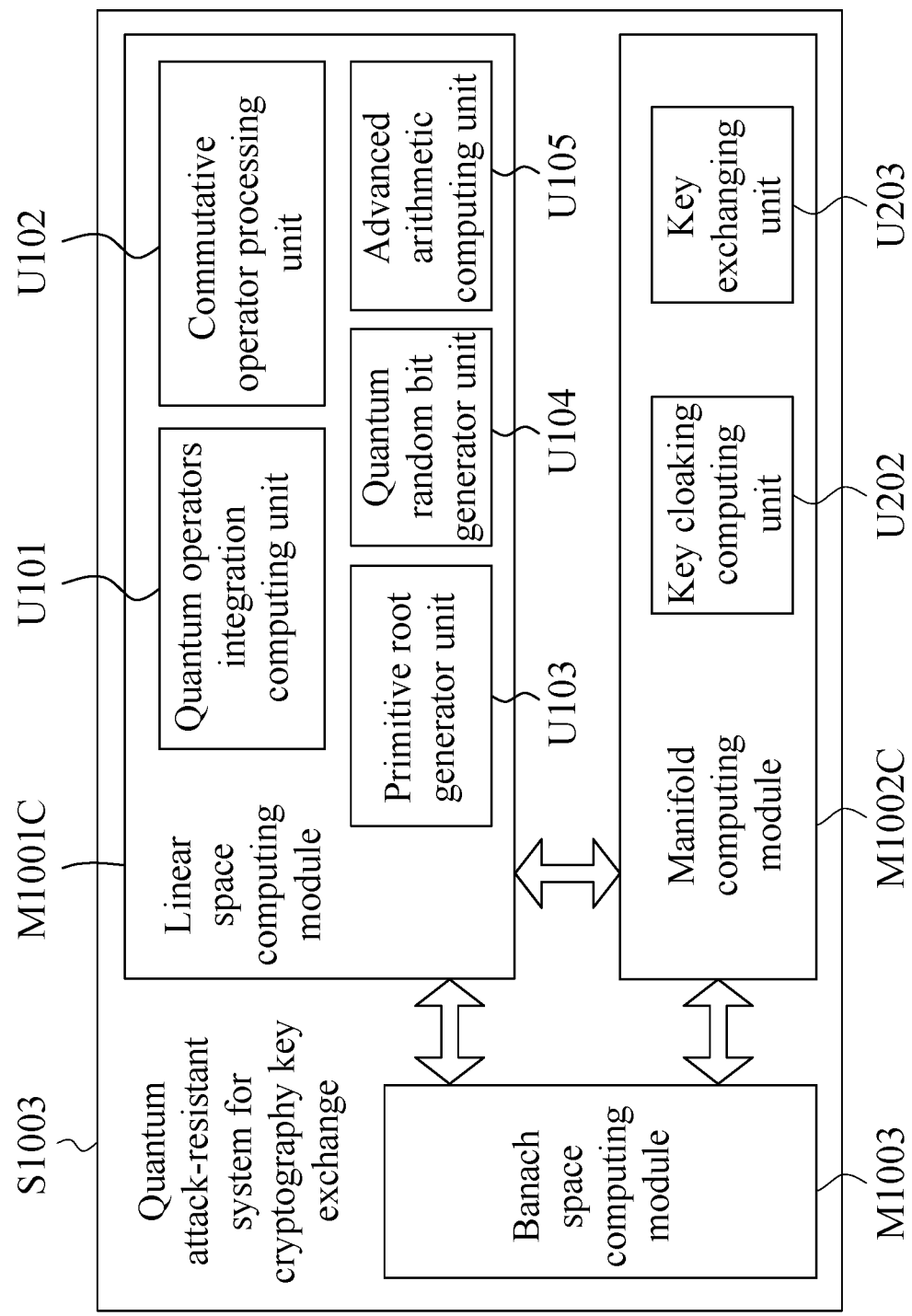
FIG. 13 is a structural block diagram of a system according to an embodiment of the present invention.
Figure 14:
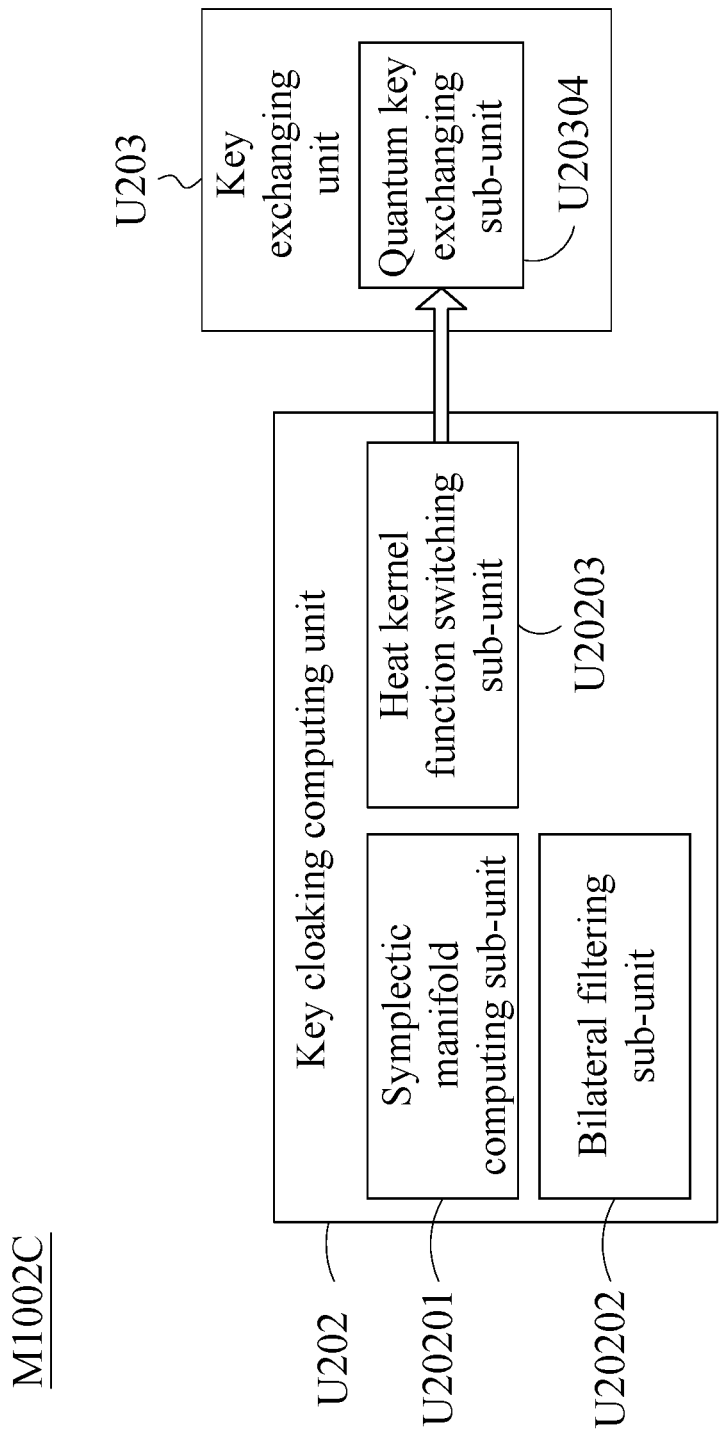
FIG. 14 is a structural block diagram of a manifold computing module according to an embodiment of the present invention.

The quantum attack-resistant system for cryptography key exchange can be implemented in an application scenario where quantum keys are used. Please refer to FIG. 13, in an embodiment of the quantum attack-resistant system for cryptography key exchange S1003, in the case for quantum keys, at least comprises: a linear space computing module M1001C; a manifold computing module M1002C; and a Banach space computing module M1003. The difference between the quantum attack-resistant system for cryptography key exchange S1003 as shown in FIG. 13 and the one S1001 as shown in FIG. 3A is that the manifold computing module M1002C can at least implement the key cloaking computing unit U202 in the embodiment of FIG. 13. Please refer to FIG. 14, which is a structural block diagram of a manifold computing module to an embodiment of FIG. 13. As shown in FIG. 14, the manifold computing module M1002C includes a key cloaking computing unit U202 (that is, the switching-operation & coupling-process unit U200 as shown in FIG. 1A includes the key cloaking computing unit U202) and the corresponding key exchanging unit U203 comprising a quantum key exchanging sub-unit U20304, which can be implemented with reference to the aforementioned corresponding embodiments (see FIG. 6 and FIG. 9).

Thus, the above several embodiments present the quantum attack-resistant mechanisms for cryptography key exchange, and they can be further implemented as mechanisms for homotopy-morphing operations or for key-cloaking processes, or as mechanisms for both homotopy-morphing operations and key-cloaking processes. This technology can be implemented as a quantum attack-resistant device or system with a high strength scheme of cryptography key exchange, and can be implemented on the transmitter side and the receiver side for data communication. In some embodiments, the present technology can be compatible with the operations of legacy cryptography key and quantum cryptography key in different algebraic spaces. That not only effectively avoids generic quantum computing attacks during the key exchange processes, but also can be implemented by devices with reasonable cost. It facilitates overcoming the bottleneck related to the requirement of heavy-cost devices for most conventional PQC solutions. For example, the corresponding implementation for the homotopy-morphing mechanism can be performed in a computing device (such as a computer or a server with an efficient processor or graphics processor) that belongs to a legacy computer (as opposed to a quantum computer).

Figure 3C:
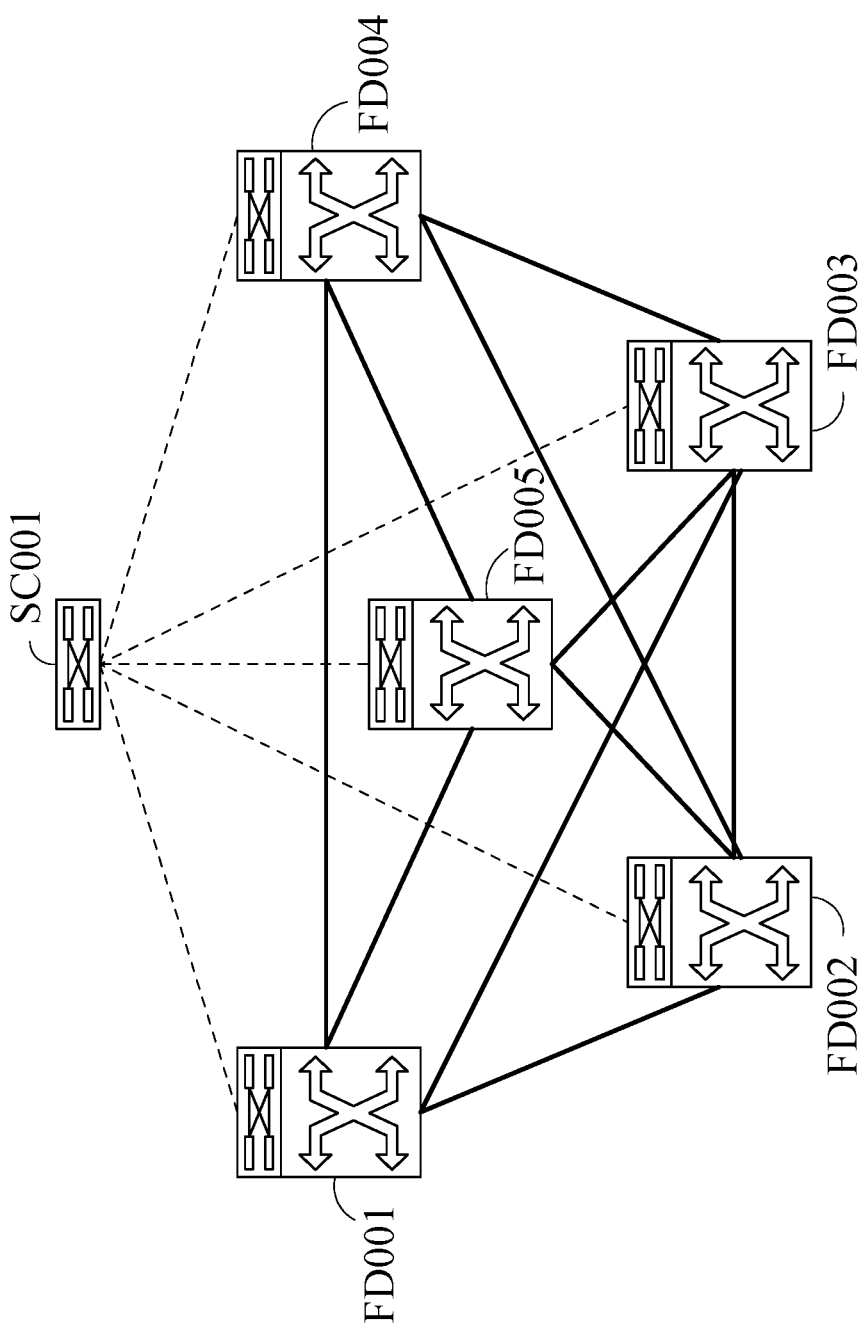
FIG. 3C is a schematic diagram of a system according to an embodiment of FIG. 3A.
Figure 3D:
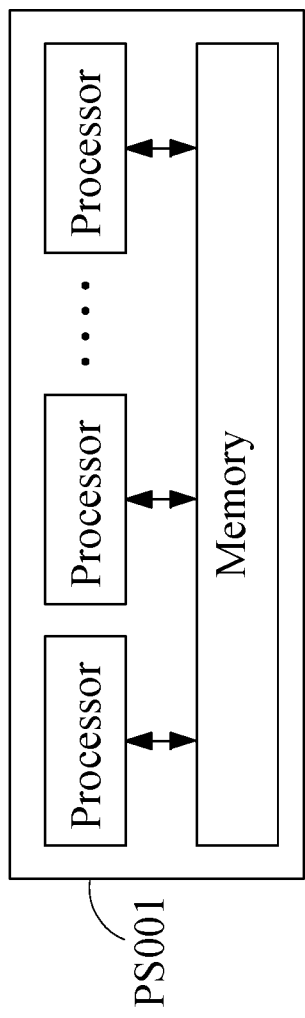
FIG. 3D is a schematic diagram of a computing device according to an embodiment.

In addition to the above embodiments for the technologies of the present invention, there is an example of the system S1001 implemented based on FIG. 3A for reference. This example is constructed with conventional approaches of SDN (Software Defined Networking)/NFV (Network Function Virtualization). Referring to both FIG. 3A and FIG. 3C, for example, the linear space computing module M1001A can be implemented as a specific computing network with SDN approach, as exemplified in FIG. 3C. A manager software application of the linear space computing module M1001A can be installed in a server SC001 which plays the role of an SDN controller as well. Each unit (U101-U105) of the linear space computing module M1001A can be installed on each forwarding device (FD001-FD005) of the specific computing network. Each forwarding device (FD001-FD005) can receive the management instructions of the linear space computing module M1001A from the server SC001 and send back the performing results of each unit (U101-U105) to the server SC001 as well. Since FD001-FD005 are forwarding devices of conventional SDN, there is a decoupled controller (e.g., represented by a block communicatively coupled to the server SC001 through a link represented by a dashed line) on each forwarding device so that the forwarding devices (FD001-FD005) can communicate with each other based on the functional requirement of each unit (U101-U105). For example, the primitive root generator unit U103 is installed on FD003, and the quantum random bit generator unit U104 is installed on FD004. Once the system S1001 need to derive an applicative cyclic group, the manager application of M1001A installed on SC001 will send corresponding instructions to FD003 and FD004, and then the decoupled controller on FD0004 will help to send the quantum random bit generated by U104 to FD003, thus U103 can derive applicative algebraic cyclic group in the linear space with true randomness. However, a forwarding device can be a tower station or a virtual machine, etc. and it depends on the required specification of each unit. For example, the forwarding device for supporting the commutative operator processing unit U102 may be implemented by a computing device, such as a micro server with a parallel system, indicated by PS001, as shown in FIG. 3D. Referring to FIG. 3D, the computing device may include a plurality of physical processors with a concurrent memory to support some quantum computing with matrix operations. For another example, the forwarding device for supporting the primitive root generator unit U103 can be implemented by a computing device, such as an IOT (internet of things) device.

Figure 3E:
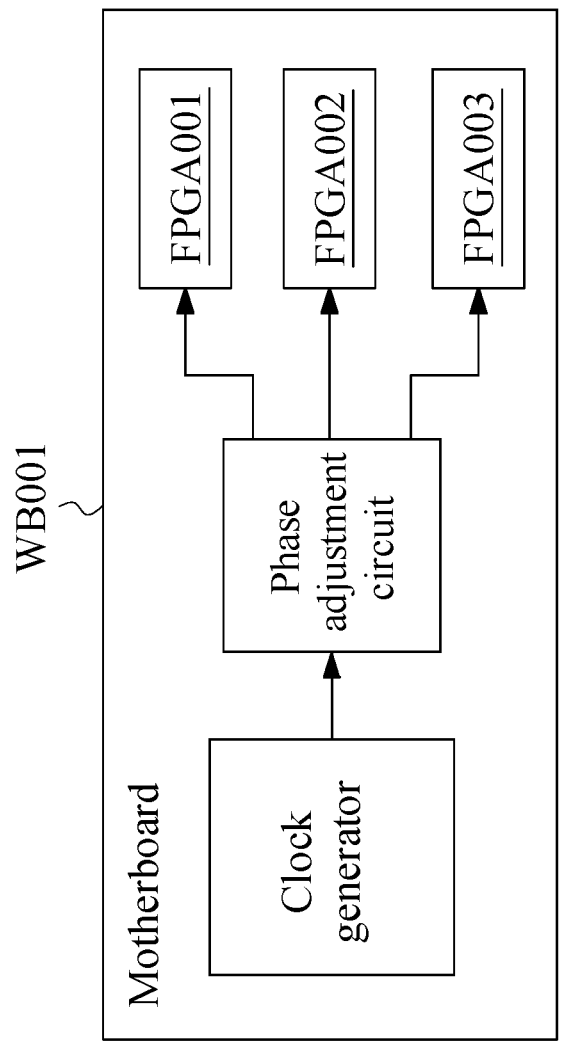
FIG. 3E is a schematic diagram of a computing device according to an embodiment.

Referring to the above examples, the manifold computing module M1002A and the Banach space computing module M1003 can be implemented in the similar way. The modules (M1001A, M1002A, and M1003) of the system S1001 are working on an infrastructure coordinated with NFV approaches. However, the forwarding device for supporting the key exchanging unit U203 should be able to play a role of a transceiver for quantum communication. The example of the system S1001 is for the sake of illustration only, and the implementation of the invention is not limited thereto. For example, the forwarding device can be implemented as a part of a distributed system or commodity servers as well, and the SDN is possible to be replaced with any traditional network or an intranet formed with stand-alone computers. In some embodiments, all of the SDNs for the implementation of each module can be integrated into a huge server with various micro systems. In another example of S1001, the forwarding device FD005 for performing the role of advanced arithmetic computing unit U105 can be designed as a computing device, such as a computing workbench WB001 with a plurality of embedded FPGAs (as shown on FIG. 3E), wherein the computing workbench includes a motherboard which can provide different user-defined clocks to different FPGA modules (e.g., FPGA001-FPGA003) for performing roles as various sub-units (e.g., U10501-U10503 as shown in FIG. 5) of the advanced arithmetic computing unit U105. The computing workbench, for example, may employ a clock generator to provide one or more clocks, or further optionally use a phase adjustment circuit to provide different clocks at different frequencies.

Figure 3F:
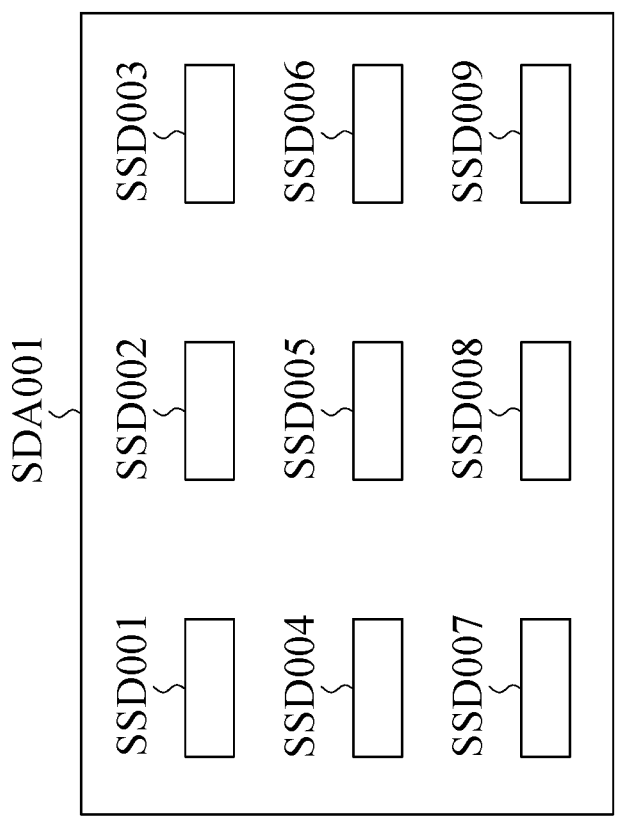
FIG. 3F is a schematic diagram of an SSD array according to an embodiment.

In an example of S1001, each unit (U301-U309 as shown in FIG. 10A) of the Banach space computing module M1003 can be implemented as a part of a non-transitory machine-readable medium (e.g., an SSD (solid-state device) array SDA001 as shown in FIG. 3F), and each part of the non-transitory machine-readable medium stores a set of specific instructions. Referring to FIG. 3A and FIG. 10A, U301-U309, for instance, can be implemented into SSD001-SSD009, and the SSD array SDA001 is located in a server which is an SDN controller with multiple physical processors. For example, a manager software application of M1003 is installed in this SDN controller, and the application can access SSD001-SSD009 to coordinate U301-U309 to be executed by one or more processors for performing the various switching processes between a topology space and a Banach space.

While the present disclosure has been described by means of specific embodiments, numerous modifications and variations could be made thereto by those skilled in the art without departing from the scope and spirit of the present disclosure set forth in the claims.

What is claimed is:

1. A quantum attack-resistant system to facilitate and enhance processes of cryptography key exchange, the system comprising:
   a) a linear space computing module, for supporting basic linear space operations, the linear space computing module including:
      1) a primitive root generator unit for deriving applicative cyclic group in a linear space;
      2) a quantum random bit generator unit for providing true randomness for the primitive root generator unit; and
      3) an advanced arithmetic computing unit for providing computing capability of modulo powers for data formed with algebraic structures;
   b) a manifold computing module, coupled to the linear space computing module, for supporting manifold topology computing for a cryptography key, the manifold computing module including:
      1) a switching-operation & coupling-process unit for performing manifold topology operations for the cryptography key to derive a switched key; and
      2) a key exchanging unit for processing the switched key for a transmitter or a receiver to facilitate and enhance processes of cryptography key exchange; and
   c) a Banach space computing module, coupled to the linear space computing module and the manifold computing module, for supporting the manifold computing module to facilitate the quantum attack-resistant processes of the key exchange in a topology space, and then retrieving original cryptography key information in a Hilbert space with a switching process based on a basis of Banach space.

2. The quantum attack-resistant system to facilitate and enhance processes of cryptography key exchange according to claim 1, wherein the switching-operation & coupling-process unit of the manifold computing module comprises a homotopy morphing computing unit for performing homotopy morphing operations on a legacy key or a quantum key for deriving a homotopy-morphed key as the switched key.

3. The quantum attack-resistant system to facilitate and enhance processes of cryptography key exchange according to claim 1, wherein the switching-operation & coupling-process unit of the manifold computing module comprises a key cloaking computing unit for performing cloaking process on a quantum key for deriving a cloaked key as the switched key.

4. The quantum attack-resistant system to facilitate and enhance processes of cryptography key exchange according to claim 1, wherein the switching-operation & coupling-process unit of the manifold computing module comprises:
   a homotopy morphing computing unit for performing homotopy morphing operations on a legacy key or a quantum key for deriving a homotopy-morphed key as the switched key; and
   a key cloaking computing unit for performing cloaking process on a quantum key or a homotopy-morphed quantum key for deriving a cloaked key as the switched key.

5. The quantum attack-resistant system to facilitate and enhance processes of cryptography key exchange according to claim 1, wherein the linear space computing module further comprises:
   a quantum operators integration computing unit for supporting basic quantum operations in the linear space; and
   a commutative operator processing unit for maintaining the completeness of the original cryptography key information.

6. The quantum attack-resistant system to facilitate and enhance processes of cryptography key exchange according to claim 5, wherein the quantum operators integration computing unit comprises:
   a unitary transformation computing sub-unit for performing unitary transformation for linear matrices;
   a dimension reduction computing sub-unit for performing dimension-reduction process for a unitary matrix in hyperspace;
   an orthonormal basis filtering sub-unit for performing a verification of orthonormality for the bases of a vector space;
   an inner product computing sub-unit for performing inner product operations for the vector space;
   an eigenization computing sub-unit for deriving eigen value and eigen vector for the vector space;
   a Hermitian verification sub-unit for checking whether a quantum operator for use is a Hermitian operator;
   a ground state analysis sub-unit for finding the quantum transition probability for a ground state;
   a Laplace Transform sub-unit for deriving wave vectors which are perpendicular with each other in the vector space; and a conversion computing sub-unit for making use of suitable conversion operators to switch a vector space to a conjugated complex space.

7. The quantum attack-resistant system to facilitate and enhance processes of cryptography key exchange according to claim 1, wherein the advanced arithmetic computing unit of the linear space computing module comprises:
an algebraic ring computing sub-unit for performing maintenance and computing processes for data on an algebraic ring;
a Galois group computing sub-unit for deriving a Galois group and performing computing processes for it; and
a root modulo powers of squaring process sub-unit for performing squaring processes for root modulo powers by making use of Euler's theorem and Fermat's little theorem.

8. The quantum attack-resistant system to facilitate and enhance processes of cryptography key exchange according to claim 2, wherein the homotopy morphing computing unit of the manifold computing module comprises: a pseudo-Riemannian manifold computing sub-unit for switching a legacy key or a quantum key into a Lorentzian manifold model to obtain a homotopy-morphed key in the form of Lorentzian manifold; a Finsler manifold computing sub-unit for promoting the metrics of Lorentzian manifold to a Finsler space to switch the homotopy-morphed key from the form of Lorentzian manifold to the form of Finsler manifold; a Calabi-Yau manifold computing sub-unit for making use of Calabi-Yau quantic polynomial to switch the homotopy-morphed key from the form of Finsler manifold in a complex three-dimension space to the form of Calabi-Yau manifold; and a parallelizable manifold verification sub-unit for verifying whether the homotopy-morphed key is in a form of parallelizable manifold to confirm whether the switched key is applicable.

9. The quantum attack-resistant system to facilitate and enhance processes of cryptography key exchange according to claim 3, wherein the key cloaking computing unit of the manifold computing module comprises: a Symplectic manifold computing sub-unit for cloaking the combination of the quantum key states with a form of Symplectic manifold modeled via a phase space; a bilateral filtering sub-unit for dropping unsuitable quantum states and retaining necessary information on the manifold edge; and a heat kernel function switching sub-unit for switching the position operator of multiple quantum states into a heat kernel function by making use of Dirac .delta.-function to achieve the effect of cloaking the quantum key.

10. The quantum attack-resistant system to facilitate and enhance processes of cryptography key exchange according to claim 9, wherein the bilateral filtering sub-unit of the key cloaking computing unit comprises:
a quantum decoherence filter for filtering out the decohered quantum states;
a probability threshold configuration sifter for sieving the quantum states whose probability of occurrence is higher than a configured threshold based on corresponding wave function; and
an Information Retainer for retaining the important information on the non-manifold edges after the homotopy morphing process.

11. The quantum attack-resistant system to facilitate and enhance processes of cryptography key exchange according to claim 4, wherein the key exchanging unit of the manifold computing module further comprises:
a legacy key exchanging sub-unit for switching the switched legacy key or the switched quantum key from a form of manifold data to a form of integral data derived with an integral equation of a curvature polynomial, parameterize the curvature polynomial expressed for the integral data, and then make use of a partial differential equation evoluted over time to facilitate and enhance the processes of cryptography key exchange via a legacy channel; and
a quantum key exchanging sub-unit for switching numeric pairs formed from the quantum key which is cloaked in a heat kernel function to a complex plane generated by an infinite-iteration process, find the non-trivial zeros closed to the corresponding coordinates of the complex plane, and then make the set of all corresponding non-trivial zeros, the numeric pairs on the complex plane and the derived parameters of the complex plane, be coupled to a super-singular elliptic curve for performing encryption processes to facilitate and enhance the processes of cryptography key exchange and authentication.

12. The quantum attack-resistant system to facilitate and enhance processes of cryptography key exchange according to claim 2, wherein the key exchanging unit of the manifold computing module comprises:
a legacy key exchanging sub-unit for switching the switched legacy key or the switched quantum key from a form of manifold data to a form of parameterized data with time function, wherein parameters of the parameterized data are derived from an integral equation of a curvature polynomial, and then coupled to a partial differential equation evoluted with time intervals to facilitate and enhance the processes of cryptography key exchange via a legacy channel.

13. The quantum attack-resistant system to facilitate and enhance processes of cryptography key exchange according to claim 11, wherein the legacy key exchanging sub-unit of the key exchanging unit comprises: a topology surface switching processor for making use of the Chern-Gauss-Bonnet theorem to switch the switched key from a form of a closed even-dimensional Riemannian manifold to a form derived with the integral equation of the curvature polynomial; and a nonlinear partial differential processor for delivering all the curvature parameters of the curvature polynomial via various nonlinear parabola partial differential equations evoluted over time.

14. The quantum attack-resistant system to facilitate and enhance processes of cryptography key exchange according to claim 3, wherein the key exchanging unit of the manifold computing module comprises:
a quantum key exchanging sub-unit for switching numeric pairs formed from the quantum key which is cloaked in a heat kernel function to a complex plane generated by an infinite-iteration process, find non-trivial zeros closed to corresponding coordinates of a complex plane, and then make the set of all corresponding non-trivial zeros, the numeric pairs on the complex plane and the derived parameters of the complex plane, be coupled to a super-singular elliptic curve for performing encryption processes to facilitate and enhance the processes of cryptography key exchange and authentication.

15. The quantum attack-resistant system to facilitate and enhance processes of cryptography key exchange according to claim 14, wherein the quantum key exchanging sub-unit of the key exchanging unit comprises:
a supersingular elliptic curve encryptor for selecting a suitable super-singular elliptic curve, and using super-singular primes which fit a Galois group as generation points to generate encryption parameters for use in a simulation of the ElGamal encrypt algorithm;

a Mandelbrot set generator for switching the numeric pairs formed from the quantum key which is cloaked in the heat kernel function to a complex plane of a Mandelbrot set which is generated by an infinite-iteration process;

a non-trivial zeros generator for finding the non-trivial zeros which are closed to Riemann zeta function under Riemann hypothesis in accordance with the switched numeric pairs on the complex plane;

a twin prime generator for generating twin primes which fit a form of twin prime conjecture in accordance with the primes mapped from the found non-trivial zeros, and then construct a square matrix for use in modular operations in accordance with the primes mapped from the found non-trivial zeros and the corresponding generated twin primes; and a modular matrix verifier for performing inverse operation for verification processes with the received primes and the generated modular square matrix on the receiver side to confirm the correctness of the encrypted data exchange.

16. The quantum attack-resistant system to facilitate and enhance processes of cryptography key exchange according to claim 1, wherein the Banach space computing module is coupled to the manifold computing module to facilitate and enhance processes of cryptography key exchange in the topology space, and then make use of first manifold data applied in the key exchange process to derive the original cryptography key information in a Hilbert space via a switching process based on a basis of Banach space; the Banach space computing module comprises:

a Topology-Banach space switching unit for using Theorema Egregium on the first manifold data in a topology space to switch it to a Banach space to derive second manifold data, wherein the first manifold data is in the form of a manifold in the topology space and the second manifold data is in the form of a manifold in the Banach space;

a minimum inner isomorphism analysis unit for finding corresponding minimum isomorphic commutative group based on the second manifold data, via making use of operations with approximate isometries in the Banach space;

a smooth topological space verification unit for performing an operation of Cauchy inequality to complete a convergence verification to confirm the correctness of the switching process from the topology space to the Banach space wherein the switching process is performed by the Topology-Banach space switching unit;

a Peano curve switching unit for performing space dimension switching processes on the second manifold data with iterative operations, to switch the data from the form based on a commutative group in a multi-dimensional space to the form of a Peano curve in a one-dimensional space, thus the switched data is in the form of the Peano curve in the one-dimensional space;

a Riemann integral computing unit for switching the data derived from the Peano curve switching unit to first geometric data in the form of a plane via performing operations of Riemann integration;

a uniformly convex Banach space switching unit for performing curved surface switching processes in a uniformly convex space to switch the first geometric data in the form of a plane to second geometric data in the form of a curved surface;

a super-reflexive Banach space verification unit for checking the result of mapping the second geometric data from a curved surface to a super-reflexive Banach space to confirm whether the second geometric data is applicable, and confirm whether the switching processes in a uniformly convex space fits duality and reversibility;

a sub-reflexive Banach computing verification unit for checking whether the second geometric data in a form of a curved surface is differentiable, and then performing operations of dimensionality reduction, mapping process, and retaining the weak attribute of metric if the second geometric data is differentiable, and finally to derive third geometric data in a form of weak-star topology; and a weak-star topology space switching unit for performing linear operations on the third geometric data in a dual vector space with the basis of the Banach space, to switch the third geometric data from the form of the weak-star topology to the form of a normed vector space, wherein the switched third geometric data in the form of the normed vector space can retrieve the original cryptography key information in a Hilbert space via making use of the basis of the Banach space.

17. The quantum attack-resistant system to facilitate and enhance processes of cryptography key exchange according to claim 11, for facilitating and enhancing quality of quantum communication, wherein the key exchanging unit of the manifold computing module further comprises:

a quantum steering component which is for a quantum channel to perform quantum communication with quantum steering mechanism; and a Bell measurement component for confirming whether there is decoherence issue with the quantum communication.

18. The quantum attack-resistant system to facilitate and enhance processes of cryptography key exchange according to claim 5, wherein the commutative operator processing unit comprises:

a Pauli matrix verifier for confirming whether there is a degeneration issue with the current system states;

a Hermitian switch validator for confirming whether a system with degenerated state can still perform Hermitian function correctly;

a complete set of commuting observables (C.S.C.O.) processor coupled to both of the Pauli matrix verifier and the Hermitian switch validator for recovering the degeneration issue for a recoverable quantum system; and a projection-operator simulator, wherein the simulator will perform a linear combination of creation operator, annihilation operator, and the degenerated Pauli matrix to simulate the applicable projection operators when the C.S.C.O processor cannot solve the degeneration issue, and then applies the corresponding projection states as the recovered states.

\* \* \* \* \*